(12) United States Patent
Takaoka et al.

(10) Patent No.: US 6,540,215 B2
(45) Date of Patent: Apr. 1, 2003

(54) LIQUID SEALED VIBRATION ISOLATOR HAVING A PARTITION DEFINING A PORTION OF A CIRCUMFERENTIAL ORIFICE

(75) Inventors: Masashi Takaoka, Osaka (JP); Yukio Takashima, Osaka (JP); Tsutomu Hashimoto, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 09/948,440

(22) Filed: Sep. 7, 2001

(65) Prior Publication Data

US 2002/0036370 A1 Mar. 28, 2002

Related U.S. Application Data

(62) Division of application No. 09/599,933, filed on Jun. 22, 2000, now Pat. No. 6,435,487.

(30) Foreign Application Priority Data

Jul. 12, 1999 (JP) .......................................... 11-198216
Jul. 13, 1999 (JP) .......................................... 11-198614

(51) Int. Cl.⁷ ................................................ F16F 13/00
(52) U.S. Cl. ................................ 267/140.13; 267/219
(58) Field of Search ........................ 267/140.11, 140.13, 267/140.14

(56) References Cited

U.S. PATENT DOCUMENTS 4,483,521 A * 11/1984 Kakimoto .............. 267/140.13
6,158,724 A * 12/2000 Takashima et al. .... 267/140.13
6,224,045 B1 * 5/2001 Muramatsu et al. ... 267/140.13

* cited by examiner

*Primary Examiner*—Matthew C. Graham
(74) *Attorney, Agent, or Firm*—Jordan and Hamburg LLP

(57) ABSTRACT

The present invention aims at providing a liquid sealed type vibration isolator capable of positioning a partition excellently with the construction of the partition simplified, and maintaining stable damping characteristics of an orifice. To meet the requirements, an outer circumferential portion of the partition forming the orifice is made so that the outer circumferential portion defines at least a part of one or two sides of a cross section of the orifice, and a positioning device formed of a partition press fitting or inserting structure with respect to a groove, or a partition engaging structure is provided in a joint portion between the partition and the other orifice forming member with the construction of the partition simplified, whereby it is rendered possible to improve the accuracy of the partition and obtain a desired cross section of the orifice.

4 Claims, 26 Drawing Sheets

LIQUID SEALED VIBRATION ISOLATOR HAVING A PARTITION DEFINING A PORTION OF A CIRCUMFERENTIAL ORIFICE

This is a division of application Ser. No. 09/599,933, filed Jun. 22, 2000 now U.S. Pat. No. 6,435,487.

BACKGROUND OF THE INVENTION

1. Field of the Invention

This invention relates to a liquid sealed type vibration isolator used to support a vibration generating member including mainly an automobile engine.

2. Description of the Related Art

The known liquid sealed type vibration isolators, such as an engine mount for supporting a vibration generating member, such as an automobile engine so that the vibration of the vibration generating member is not transmitted to a body include, for example, a liquid sealed type vibration isolator shown in FIG. 26, or a liquid sealed type vibration isolator shown in FIG. 27 or 28.

All of these related art liquid sealed type vibration isolators 100 include a metal fixing member 102 to be secured to one of vibration generating member, such as an engine and a support member, such as a body, a metal fixing member 103 to be secured to the other thereof, a vibration isolating base member 104 connecting these two metal fixing members 102, 103 together and formed of an elastic body of a rubber-like material, a diaphragm 106 provided on the side of the metal fixing member 103 so as to be opposed to the vibration isolating base member 104, a liquid chamber 105 formed between the vibration isolating base member 104 and diaphragm 106, and a partition 107 dividing the liquid chamber 105 into two, i.e. a main liquid chamber 105a and an auxiliary liquid chamber 105b, an orifice 118 communicating the main and auxiliary liquid chambers with each other being formed on an outer circumferential side of the partition 107 to fulfil a vibration damping function of the vibration isolator by an effect of flows of a liquid, which occur owing to the provision of the orifice 118, in the two liquid chambers, and also a vibration insulating function of the vibration isolator by the vibration isolating base member 104.

In the case of the liquid sealed type vibration isolator shown in FIG. 27 or 28, an elastic film of a rubber-like material 180 is provided in addition to the above-described structure, in a central region of the partition 107 by a vulcanization bonding device or a sandwiching device so as to reduce a dynamic spring constant of a high-frequency region (especially, an engine noise region).

In order to obtain stable product characteristics of such a liquid sealed type vibration isolator, it becomes an important factor that the volume, especially, a cross-sectional area of the orifice having a vibration damping function be set to a desired level.

However, all of the liquid sealed type vibration isolators of FIGS. 26, 27 and 28 employ a mode in which an outer circumferential portion of the partition 107 constitutes upper and inner circumferential surfaces and a bottom surface of the orifice, i.e. three sides of a cross section of the orifice, and in which a cylindrical liquid chamber-forming rubber portion 122, which guides the partition 107 for the press fitting of the same thereinto, and which is on the inner circumferential side of a cylindrical trunk portion 114 of the metal fixing member 103, constitutes the remaining one side (outer circumferential surface) of the cross section of the orifice.

Therefore, when, especially, the partition 107 is formed by bending one piece of metal plate by pressure molding or deep drawing, a molding process for forming the three sides of a cross section of the orifice becomes complicated.

When the construction of the partition 107 is simplified so that the pressing or deep drawing thereof can be carried out easily, for the purpose of overcoming the difficulties, there is the possibility that problems arise concerning the radial and vertical positioning of the partition. Especially, when a structure like those of the related art vibration isolators of FIGS. 26, 27 and 28 is employed in which a lower end portion of the partition 107 is bent radially outward with the resultant outer end portion 171 caulked to a caulking portion of the metal fixing member 103, i.e. a fastened section 116 formed by a caulking device and formed of the cylindrical trunk portion 114 and a bottom member 113 of the metal fixing member 103, there is the possibility that the partition 107 slips in the radial and vertical directions due to a tightening force of the caulking device.

When the partition is thus displaced in the radial and vertical directions, the orifice formed by utilizing the partition cannot be set to a desired cross-sectional area, so that stable product characteristics cannot be obtained.

According to an aspect of the present invention, the liquid sealed type vibration isolator is capable of solving these problems, and obtaining stable characteristics.

In the case of the liquid sealed type vibration isolator provided with the elastic film 180 in a central region of the partition 107 which divides the liquid chamber 105 into two, i.e. main and auxiliary chambers, the elastic film setting system has problems different from those encountered in the above-described vibration isolator.

Namely, in the case of the liquid sealed type vibration isolator of FIG. 27, the lower end portion of the partition 107 is caulked to the fastened section 116 of one metal fixing member 103 with an upper end portion of a cylindrical side wall 172 expanded and press fitted into an inner circumference of the liquid chamber-forming rubber portion 122, whereby the orifice 118 is formed between the cylindrical side wall and liquid chamber-forming rubber portion 122. The elastic film of a rubber-like material 180 is vulcanization bonded to a central opening of a top plate portion 123 of the partition 107.

In the case of the liquid sealed type vibration isolator of FIG. 28, the partition 107 is formed of two partition members 107a, 107b. The upper partition member 107a is of a disc type shape, provided with an opening 173 in a central portion thereof and press fitted in the liquid chamber-forming rubber portion 122. The lower partition member 107b is formed to a shape of an inverted cup, bent radially outward at a lower end portion thereof and caulked at the same portion to the fastened section 116 of the metal fixing member 103, provided with an opening 175 in a top plate portion 174 thereof, and has the elastic film of a rubber-like material 180 held between the top plate portion 174 and upper partition member 107a. A space surrounded by an outer circumferential portion of the upper partition member 107a, cylindrical side wall 172 of the lower partition member 107b, and liquid chamber-forming rubber portion 122 forms the orifice 118 which communicates the main and auxiliary liquid chambers 105a, 105b with each other.

Regarding a method of setting the elastic film 180, the partition 107 of the type in which the elastic film 180 is held between two pressing metal members (partition members) shown in the related art example of FIG. 28, the shapes of the two partition members are simplified but two metal press dies for the manufacturing of the partition members become necessary. In the case of the partition in the related art example of FIG. 27 of the type which is formed by bending one piece of metal plate, and vulcanization bonding the elastic film 180 to the bent plate, the molding of the partition itself becomes complicated, and a bonding agent application step has to be carried out before the elastic film has been formed. In all of these cases, the cost increases.

According to another aspect of the present invention, the liquid sealed type vibration isolator capable of solving the above-mentioned problems, facilitating the manufacturing of the partition provided with an elastic film thereon, and reducing the manufacturing cost.

SUMMARY OF THE INVENTION

In order to achieve the first-mentioned vibration isolator, the inventors of the present invention earnestly discussed the members by which the orifice should be formed and how to position these members for obtaining a desired cross-sectional area of the orifice, with the simplification of the partition taken into consideration as a premise.

As a result, the inventors discovered that, when the orifice was formed by defining two or one side of across section thereof out of three sides thereof by the partition, and the remaining sides thereof by, for example, the liquid chamber-forming rubber portion, vibration isolating base member or an outer circumferential reinforcing metal member of the diaphragm, and not by defining the three sides of such a cross section by the partition as in the related art examples, the shape of the partition was simplified correspondingly.

Namely, the first-mentioned invention is a liquid sealed type vibration isolator the construction of which is basically identical with those of the above-described related art examples, i.e., includes two metal fixing members for a vibration generating member and a support member, a vibration isolating base member interposed between the two metal fixing members and formed of an elastic body of a rubber-like material, a diaphragm provided so as to be opposed to the vibration isolating base member, a liquid chamber formed between the vibration isolating base member and diaphragm, and a partition dividing the liquid chamber into two, i.e. a main liquid chamber and an auxiliary liquid chamber, an orifice being formed between the partition and a liquid chamber-forming rubber portion on an outer circumferential side thereof, an outer circumferential portion of the partition being formed so as to define at least a part of one or two sides of a cross section of the orifice, either one of the partition and the other orifice-forming member being press fitted or inserted or engaged at a part thereof in a connecting section between the partition and the remaining orifice-forming member into or with the other thereof, whereby the partition and the other orifice-forming member are positioned.

According to this liquid sealed vibration isolator, the partition forms at least only a part of one or two of the wall surfaces of the orifice, the shape of the partition is simplified and variation of the shape thereof decreases. Moreover, the partition and the other orifice-forming member are positioned at the connecting section therebetween by a press fitting or inserting or engaging structure. Therefore, even when a flange portion at a lower section of the partition is caulked to the relative metal fixing member, the partition is retained without being displaced. This enables the partition molding work to be carried out easily, a highly accurate desired cross section of the orifice to be obtained, and stable characteristics to be secured.

In this structure, the partition defines at least a part of two or one side of the cross section of the orifice, so that the positioning of the partition in the liquid chamber becomes an important factor. Therefore, it is specially preferable in view of the accuracy of this positioning operation that a positioning device be formed by providing an annular positioning groove in either one of the partition and the other orifice-forming member, and a free end portion, which is to be press fitted or inserted into the groove, on the other thereof.

In this liquid sealed type vibration isolator, it is possible that the outer circumferential portion of the partition has a mode in which this outer circumferential portion is bent to an L-shaped cross section so as to define the inner circumferential surface and bottom surface of the orifice, and a mode in which the mentioned outer circumferential portion is formed as a substantially vertical wall so as to define the inner circumferential surface of the orifice with the outer circumferential reinforcing metal member of the diaphragm, which is positioned on the lower side of the vertical wall, utilized as a bottom wall of the orifice. All of these modes enable the shape of the partition to be simplified, and variation of the shape thereof and that of the shape of the outer circumferential reinforcing metal member of the diaphragm to be minimized.

A device for positioning the partition of the above-described construction employs the following structure.

When the outer circumferential portion of the partition is formed to an L-shaped cross section so as to define the inner circumferential and bottom surfaces of the orifice, an upper end section of the outer circumferential portion, which defines the inner circumferential surface of the orifice, is extended upward, i.e., in the partition inserting direction, and an annular positioning groove is formed in the liquid chamber-forming edge portion, which is opposed to this upwardly extended portion, of the vibration isolating base member, the partition being positioned by press fitting or inserting the upwardly extended portion into the groove.

Owing to this arrangement, the upper end portion of the partition is engaged with the liquid chamber-side circumferential portion of the vibration isolating base member by the press fitting of the former into the groove of the latter. Therefore, even when a lower portion of the partition is bent and extended radially outward so as to form a bottom wall of the orifice with an outer circumferential end section of the resultant lower extended portion caulked to the relative metal fixing member, the radial and vertical positioning accuracy can be kept high, and a desired cross section of the orifice can be obtained.

Even in the case where the outer circumferential portion of the partition is formed as a substantially vertical wall with the outer circumferential metal member of the diaphragm defining a bottom surface of the orifice, the upper end section of the outer circumferential portion of the partition is extended upward, and an annular positioning groove is formed in the liquid chamber-side circumferential edge portion, which is opposed to this upwardly extended portion, of the vibration isolating base member in the same manner as in the above-described case, the partition being positioned by press fitting or inserting the upwardly extended portion into the groove.

In this case, the partition is also positioned by engaging the upper end portion thereof with the liquid chamber-side circumferential edge portion of the vibration isolating member by press fitting the former into the groove of the latter, while the bottom surface of the orifice is positioned by caulking the outer circumferential reinforcing metal member of the diaphragm to the relative metal fixing member. Accordingly, a desired cross section of the orifice can be retained with a high accuracy.

When the outer circumferential reinforcing metal member of the diaphragm defines the bottom surface of the orifice as mentioned above, it is preferable that the connecting surfaces of the bottom wall of the orifice and the lower end of the partition be sealed, with a rubber member interposed therebetween. When a structure in which an annular groove is formed in this rubber member between the two connecting surfaces with the lower end portion of the partition press fitted or inserted in the groove is employed, the positioning of the two parts can also be done excellently.

The liquid sealed type vibration isolator according to the present invention can also employ a mode in which the lower surface of the outer circumferential portion of the partition constitutes the upper surface of the orifice, the outer circumferential reinforcing metal member, which is positioned on the lower side of the same lower surface, of the diaphragm being formed to an L-shaped cross section so as to define the inner circumferential and bottom surfaces of the orifice, the upper end portion of the reinforcing metal member being brought into pressure contact with the lower surface of the partition via a seal rubber member, whereby this arrangement is utilized for the formation of the orifice. In this case, the simplification of the shape of the partition, facilitation of the molding process and minimization of the variation of the shape of the partition are also attained.

When this structure is employed, it is recommended to bend the outer circumferential end portion of the partition in the upward direction, bring the resultant outer circumferential wall into pressure contact with the inner circumferential surface of the cylindrical liquid chamber-forming rubber portion, and engage the upper end portion of the partition with a flat portion formed on the liquid chamber-side circumferential edge portion, which is positioned above the liquid chamber-forming rubber portion, of the vibration isolating base member, whereby the partition is positioned. This enables the positioning of the partition as well as the outer circumferential metal member of the diaphragm to be done with a high accuracy.

Especially, since the circumferential wall is formed by upwardly bending the outer circumferential end portion the partition, an operation of a rib for heightening the rigidity of the partition is performed thereby. The circumferential wall also plays the role of a guide when the partition is press fitted into the vibration isolating base member along the cylindrical liquid chamber-forming rubber portion.

The partition can also be positioned by bringing the circumferential wall thereof into pressure contact with the inner circumferential surface of the liquid chamber-forming rubber portion, and press fitting or inserting the upper end section of the circumferential wall of the partition into the annular positioning groove formed in the liquid chamber-side edge portion of the vibration isolating base member. This enables the above-mentioned positioning operation to be carried out in a more desirable manner.

The liquid sealed type vibration isolator according to the present invention can also be constructed by forming the outer circumferential portion of the partition as a substantially vertical wall defining an upper half of the inner circumferential surface of the orifice, bending the outer circumferential reinforcing metal member of the diaphragm to an L-shaped cross section so as to define the bottom surface and a lower half of the inner circumferential surface of the orifice, and elastically engaging the upper end of the reinforcing metal member with the lower surface of the partition via the seal rubber member. In this case, the simplification of the shape of the partition, facilitation of the molding process and minimization of the variation of the shape of the partition are also attained.

When a structure is employed which is obtained by extending the outer circumferential end portion of the partition in the upward direction, forming an annular positioning groove in the liquid chamber-side edge portion, which is opposed to the upwardly extended portion, of the vibration isolating base member, and positioning the partition by press fitting or inserting the upwardly extended portion of the partition into the groove, the partition is positioned by the groove provided in the vibration isolating base member as well as the outer circumferential reinforcing metal member of the diaphragm caulked to the relative metal fixing member. When a structure is further employed which is obtained by forming an annular groove in the rubber member, and press fitting or inserting the upper end portion of the reinforcing metal member into the groove, the combining of the partition and the outer circumferential reinforcing metal member of the diaphragm with each other is done excellently, and the positioning accuracy and sealability of these parts are more improved.

In all of the above-mentioned modes, the cross-sectional shape of the orifice formed on the inner side of the outer circumferential surface of the partition is not specially limited but it is preferable, in view of the necessity of simplification of the construction of the partition, that the portion defining the inner circumferential surface of the orifice has a shape close to that of a vertical wall. As long as this condition is satisfied, the orifice may have any of a triangular cross section and a rectangular cross section.

For example, any of a structure in which a cross-sectionally triangular orifice is formed by expanding the lower part of the liquid chamber-forming rubber portion which defines the outer circumferential surface of the orifice, and a structure in which a cross-sectionally rectangular orifice is formed by providing a horizontal flat portion on the part of the liquid chamber-side circumferential edge portion of the vibration isolating base member which is above the liquid chamber-forming rubber portion defining the outer circumferential surface of the orifice, to thereby form the upper surface of the orifice; and having these parts and the partition alone or the outer circumferential metal member of the diaphragm cooperate with each other.

The partition may be obtained by any of the method of molding one piece of metal plate into a bent product, and the method of molding a cast product of aluminum into such a product. Especially, the former method enables the pressing work or deep drawing work to be simplified.

In any of these modes, varying the radial and vertical sizes of the portion to be press fitted of the partition, and the radial and vertical sizes of the groove formed in the vibration isolating base member, into which the partition is to be press fitted,.in such a manner that the groove extends in the direction of the whole circumference of the same base member enable the degree of freedom of a characteristic tuning operation to be increased. Therefore, when the liquid chamber-side circumferential edge portion of the vibration isolating base member is formed as the upper surface of the orifice, a structure is preferably employed which is formed by bending the upper end portion of the relative metal fixing member in the inward direction, and burying the resultant bent portion in the vibration isolating base member to thereby secure an increased rigidity of the portion of the vibration isolating base member which defines the upper surface of the orifice.

The shape of the central region of the partition is not specially limited. For example, when it is necessary in the vibration isolator to reduce a dynamic spring constant in a high-frequency region (especially, an engine noise region), a structure having an elastic film provided in the central region of the partition can also be employed.

In order to achieve the second-mentioned invention, the inventors of the present invention earnestly discussed the method of setting the elastic film with respect to the partition, to discover that, when one cylindrical partition and an elastic film covering the opening thereof were molded separately with the resultant products positioned firmly, it became possible to reduce the dimensions of a metal vulcanization mold for the elastic film, omit the bonding agent application process, and manufacture the partition at a low cost.

Namely, according to a second aspect of the present invention, the liquid sealed type vibration isolator includes in the same manner as the above-described invention two metal fixing members, a vibration isolating base member interposed between the two metal fixing members and formed of an elastic body of a rubber-like material, a diaphragm disposed so as to be opposed to the vibration isolating base member, a liquid chamber formed between the vibration isolating base member and diaphragm, and a partition dividing the liquid chamber into two, i.e. main and auxiliary liquid chambers, an orifice being formed between the partition and a liquid chamber-forming rubber portion extending around the partition, the partition being formed of one cylindrical partition plate, and a disc type elastic film formed to a diameter larger than that of an opening of an upper cylindrical portion of the partition plate and closing the central opening of the partition plate, the elastic film and partition plate being formed separately, the elastic film being provided with a positioning bore in a lower surface of a circumferential portion thereof, the upper cylindrical portion of the partition plate being press fitted or inserted in the positioning bore.

This structure enables the dimensions of the metal vulcanization mold for the elastic film to be reduced, and the bonding agent application process to be rendered unnecessary. Moreover, the positioning (centering) of the elastic film and partition plate can be done easily.

In order to position the partition vertically, a system for engaging the upper end of the outer circumferential portion of the elastic film with a circumferential wall of the liquid chamber, for example, a liquid chamber-side circumferential edge portion of the vibration isolating base member formed of an elastic body of a rubber-like material; forming a flange portion by bending a lower end portion of the partition in the radially outward direction; and caulking this flange portion to the relative metal fixing member can be employed. Regarding a lower end portion of the partition, a system for supporting a lower end portion of the partition plate by engaging the same lower end portion with the outer circumferential reinforcing metal member of the diaphragm can also be employed.

In all of these cases, an orifice having a desired cross-sectional area can be formed between the partition and the liquid chamber-forming rubber portion on the outer circumferential side thereof, and stable characteristics can be secured.

Concerning the positioning bore formed in the lower surface of the elastic film, the depth thereof is not specially limited. A groove formed in the lower surface of the circumferential portion of the elastic film, or a slit type through hole extending from at least a part of the lower surface of the circumferential portion of the elastic film to an upper surface can also be substituted for the positioning bore. When the through hole is employed, it is recommended that the upper end section, which is press fitted or inserted through the through hole, of the upper cylindrical portion of the partition plate be bent and caulked. This can prevent the elastic film from coming off, and enables the combining of the partition plate with the elastic film to be done reliably. The upper end section of the upper cylindrical portion may be bent either radially inward or radially outward.

The positioning bore is provided preferably so as to extend in the direction of the whole circumference of the elastic film for the purpose of preventing the leakage of a liquid from a clearance between the elastic film and partition plate. In the case of the through hole, forming a connecting portion between the central portion and outer circumferential portion of the elastic film is necessary, so that the through hole has to be formed discontinuously in the circumferential portion thereof.

When the cross-sectional area of the orifice is large, the part of the vertically intermediate portion of the cylindrical partition plate which is lower than the lower surface of the elastic film is expanded to form a stepped section on the same intermediate portion, and this stepped section can be used as a bottom wall of the orifice. This enables an orifice of a desired cross-sectional area to be obtained.

When the positioning bore is formed of a through hole, it is recommended that the upper end portion, which extends through the through hole, of the partition plate be bent radially outward and caulked, and that the elastic film be held in the direction of the height thereof (vertically) between the resultant bent end portion and the stepped section or the lower flange portion of the partition plate. Owing to this arrangement, the fixing of the partition plate and elastic film to each other can be done more easily and reliably.

The elastic film and the upper cylindrical portion of the partition plate which define the inner circumferential surface of the orifice are provided with a first opening communicating the main liquid chamber and orifice with each other, and a second opening communicating the auxiliary liquid chamber and orifice with each other. In order to prevent these two openings from being short-circuited, it is recommended that a partition wall for shutting off an orifice passage be formed on a circumferential portion of the elastic film so as to be integral with the elastic film. Even when this partition wall is provided on any of the vibration isolating base member and the elastic film, the invention can be practiced. However, providing the partition wall on the elastic film is advantageous because it enables the relation between the opening of the orifice passage and partition wall to be determined independently.

The thickness of the elastic film and the diameter of the partition plate are not specially limited but can be selected suitably in accordance with the damping characteristics thereof. Varying the thickness and diameter mentioned above enables a characteristics tuning operation to be carried out easily.

BRIEF DESCRIPTION OF THE DRAWINGS:

Preferred embodiments of the present invention will be described in detail with reference to the following figures, wherein.

DESCRIPTION OF THE PREFERRED EMBODIMENTS

The preferred embodiments of the liquid sealed type vibration isolator according to the present invention will now be described with reference to the drawings. The present invention is not limited to these embodiments.

Figure 1:
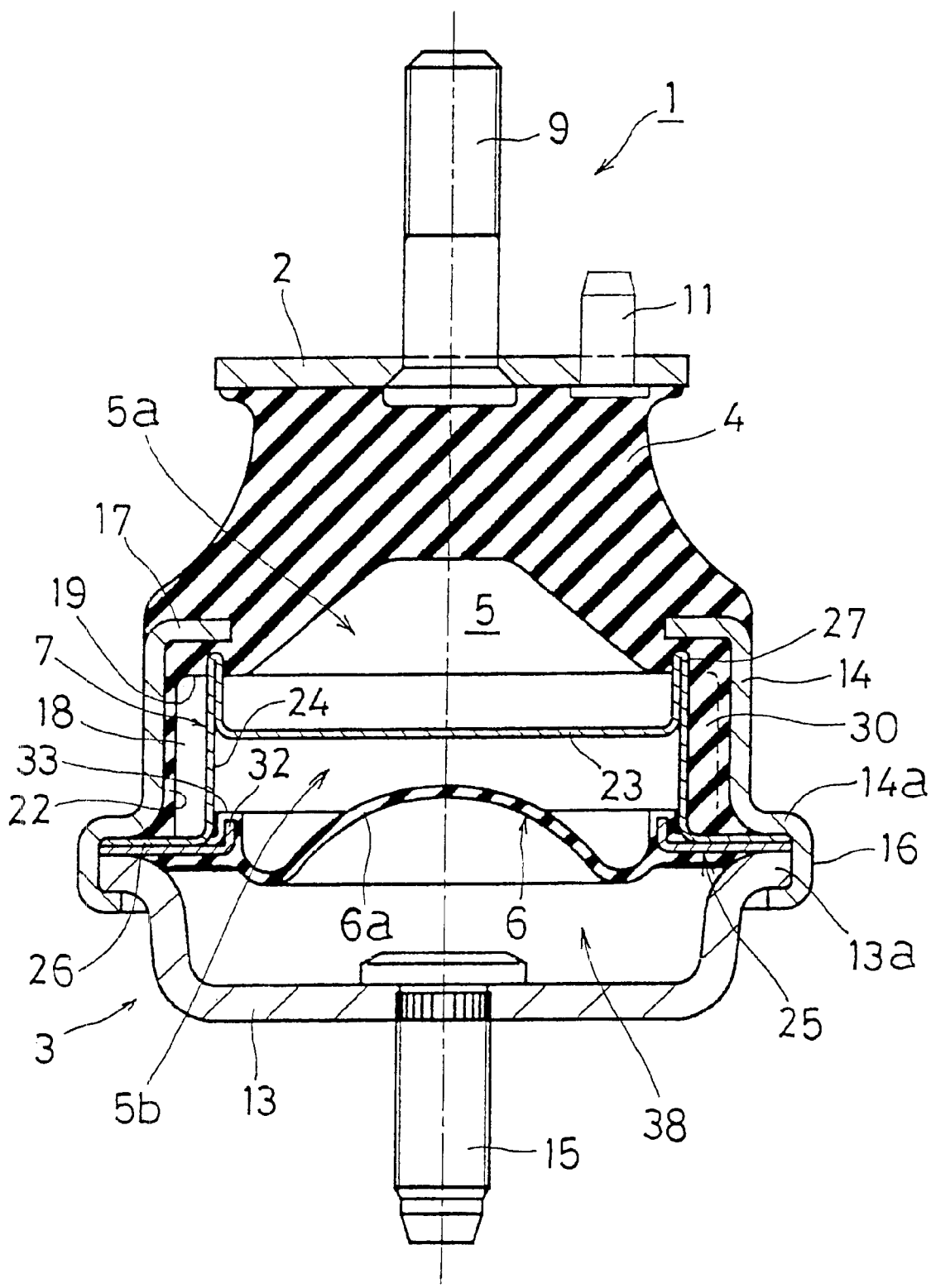
FIG. 1 is a longitudinal sectional view showing a first mode of embodiment of the liquid sealed type vibration isolator according to the first-mentioned invention.
Figure 2:
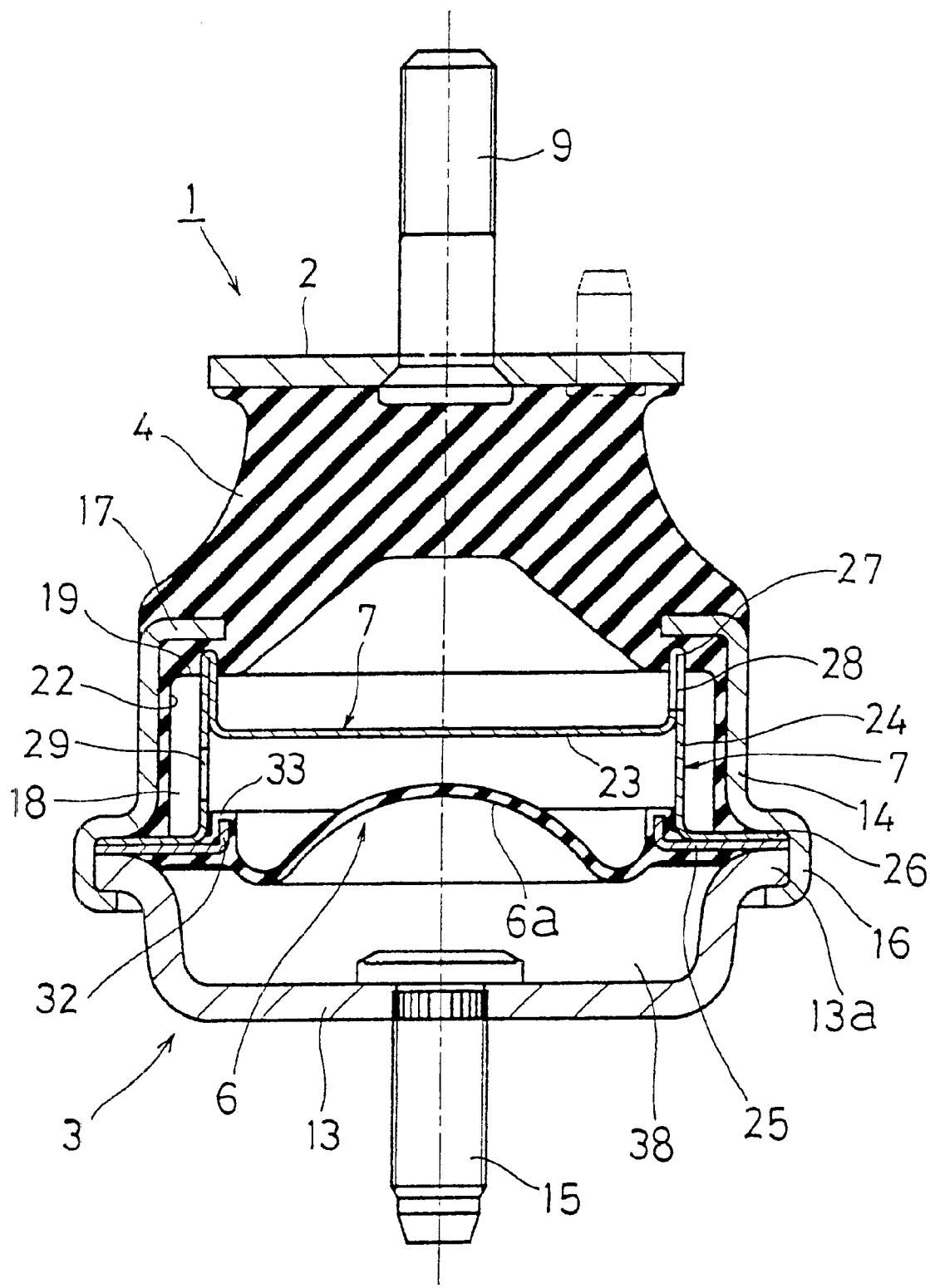
FIG. 2 is a longitudinal sectional view of the same embodiment taken along a different plane.
Figure 3:
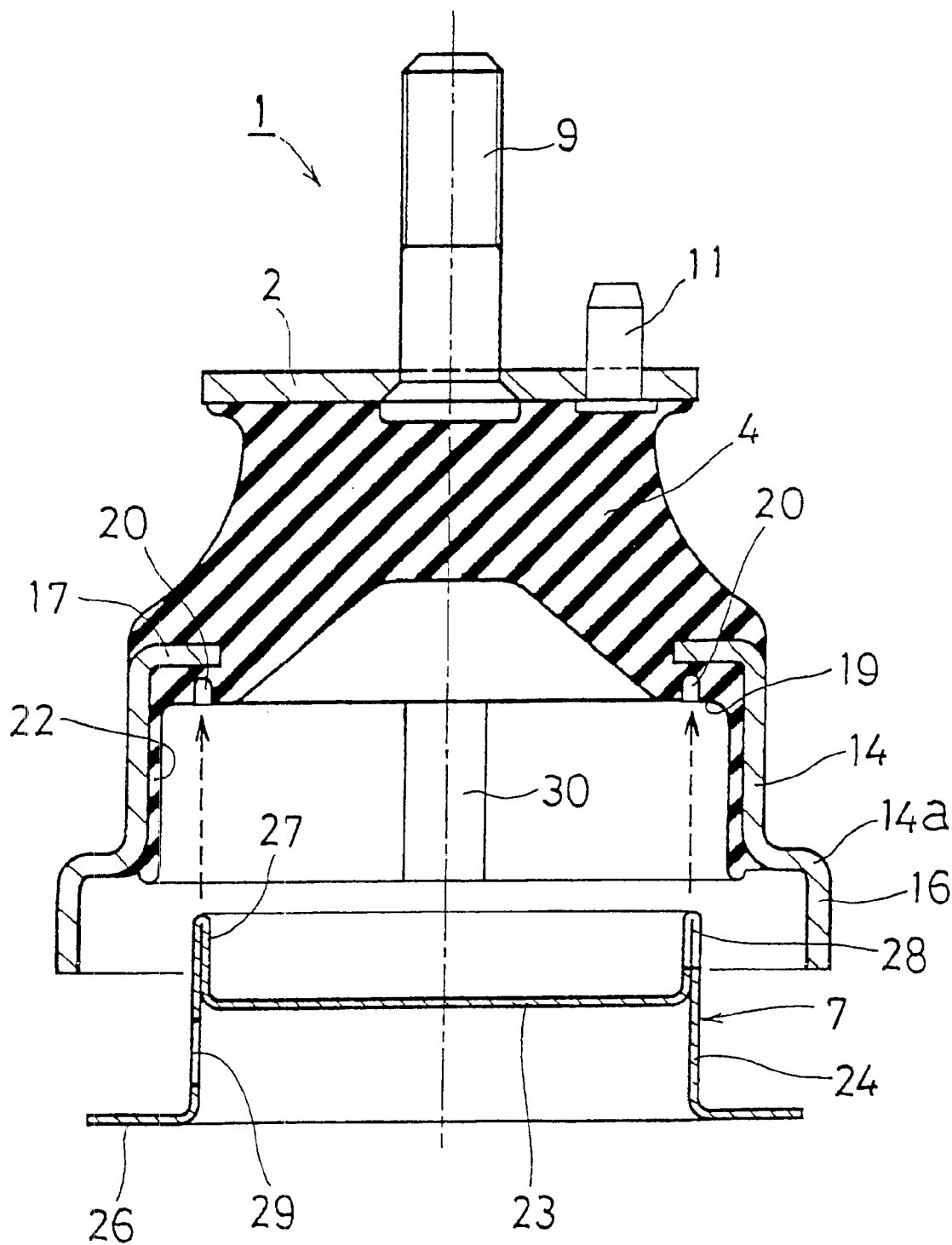
FIG. 3 is a sectional view showing a partition constituting a principal portion of the embodiment and separated from a vibration isolating base member.

FIG. 1 shows a first mode of embodiment of the liquid sealed type vibration isolator according to a first invention, and FIG. 2 is a longitudinal sectional view of the same vibration isolator taken along a different line, FIG. 3 being a sectional view of a principal portion of the same vibration isolator.

As shown in the drawings, a liquid sealed type vibration isolator 1 according to the present invention includes an upper metal fixing member 2 secured to a vibration generating member, such as an engine, a lower metal fixing member 3 secured to a body, a vibration isolating base member 4 interposed between and connecting together these two metal fixing members 2, 3 and formed of an elastic body of a rubber-like material, a diaphragm 6 provided on the side of the lower metal fixing member 3 so as to be opposed to the vibration isolating base member 4, forming a liquid chamber 5, in which a liquid is sealed, between the diaphragm 6 and vibration isolating base member 4 and formed of a rubber film, and a partition 7 dividing the liquid chamber 5 into a main liquid chamber 5a on the side of the vibration isolating base member 4 and an auxiliary liquid chamber 5b on the side of the diaphragm 6.

The upper metal fixing member 2 is formed flat, to a central portion of which a fixing bolt 9, by which the metal fixing member 2 is secured to a vibration generating member, such as an engine, is fixed in an upwardly projecting state. A pin 11 for positioning a base end portion of a metal stopper (not shown), which is adapted to prevent and absorb a large vertical displacement of the upper metal fixing member 2, is also fixed to an upper surface of the same metal fixing member 2.

The lower metal fixing member 3 includes a bottomed cylindrical bottom member 13 having an expanded outer flange 13a at an upper end thereof, and a cylindrical trunk portion 14 fastened at a lower end section thereof to the outer flange 13a from the outer side thereof.

A fixing bolt 15 for securing the lower metal fixing member 3 to the body is fixed to a bottom portion of the bottom member 13. The cylindrical trunk portion 14 has a lower end flange 14a at its lower end portion, and the lower end flange 14a and the outer flange 13a of the bottomed cylindrical member 13 are adapted to sandwich outer circumferential portions of the diaphragm 6 and partition 7 therebetween. The lower end flange 14a is provided at a free end thereof with a fastened portion 16 extended downward, and the outer flange 13a of the bottomed cylindrical member 13 is inserted into the inner side of the fastened portion 16, the fastened portion 16 being caulked to the outer flange 13a so as to enclose the latter, whereby the fastened portion 16 is in a cross-sectionally C-shaped condition. An upper end section of the cylindrical trunk portion 14 is bent inward, and an inner end of a resultant bent section 17 is extended to a position beyond a radially inner end of an orifice 18, which will be described later, and buried in the vibration isolating base member 4.

In the vibration isolating base member 4, an elastic body of a rubber-like material is formed in the shape of an umbrella to constitute a rubber body portion the upper and lower end sections of which are vulcanization bonded to the upper metal fixing member 2 and the cylindrical trunk portion 14 of the lower metal fixing member 3 respectively, the lower end section of the base member 4 also enclosing the bent portion 17 at the upper end section of the cylindrical trunk portion 14. A lower surface of the part of the vibration isolating base member 4 which is below the bent portion 17, i.e. a liquid chamber-side circumferential portion of the vibration isolating base member 4 is provided with a flat surface section 19, in which an annulalr groove 20 for press fitting or inserting thereinto an upper end portion of the partition 7 which will be described later is formed. The part of the mentioned portion of the lower surface of the vibration isolating base member which is on the radially outer side of this groove 20 defines an upper surface of the orifice which communicates the main and auxiliary liquid chambers 5a, 5b with each other. The elastic body of a rubber-like material constituting the vibration isolating base member 4 is extended in a thin film state continuously from an outer circumferential edge part of the flat surface section 19 to a lower end of an inner circumferential surface of the cylindrical trunk portion 14 to thereby form a cylindrical liquid chamber-forming rubber portion 22 defining an outer circumferential surface of the orifice.

The partition 7 is formed by deep drawing or pressure molding one piece of disc type metal plate into a bent product, and has a disc type central flat portion 23 dividing the liquid chamber 5 into main and auxiliary liquid chambers 5a, 5b. An outer circumferential section of the central flat portion 23 includes a circumferential wall 24 bent upward and stood up, and folded back and extended downward to form a cylindrical inner circumferential surface, which is formed of a vertical wall surface, of the orifice, and a flange 26 extending radially outward from a lower end of the circumferential wall 24 to form a bottom surface of the orifice.

An outer end portion of the flange 26 of the partition 7 is caulked to a fastened portion 16 of the lower metal fixing member 3. A folded portion 27 at an upper end section of the circumferential wall 24 is extended to a position higher than the upper surface of the orifice 18, and this extended end portion is positioned by being press fitted or inserted into the groove 20 of the vibration isolating base member 4.

The outer circumferential wall 24 defining the inner circumferential surface of the orifice is provided with openings 28, 29 opened into the main and auxiliary liquid chambers 5a, 5b. In order to prevent these openings 28, 29 from being short-circuited, a part of a circumferential portion of the liquid chamber-forming rubber portion 22 joined to the vibration isolating base member 4 is provided with a partition wall 30, which is adapted to shut off the two openings 28, 29 from each other, in such a manner that the partition wall 30 is integral with the vibration isolating base member 4.

Owing to this arrangement, the flange 26, circumferential wall 24, liquid chamber-forming rubber portion 22, and flat surface section 19 of the liquid chamber-forming inner circumferential edge portion of the vibration isolating base member 4 form the bottom surface, inner circumferential surface, outer circumferential surface and upper surface respectively of the orifice, and these surfaces are joined together in a liquid-tight condition to form the cross-sectionally rectangular orifice 18 which communicates the main and auxiliary liquid chambers 5a, 5b with each other.

The diaphragm 6 has an elastic film 6a of a flexible rubber-like material, and an annular outer circumferential reinforcing metal member 25 an inner end portion of which is buried firmly in an outer circumferential portion of the elastic film 6a, an outer end portion of the outer circumferential reinforcing metal member 25 being placed on the outer flange 13 of the bottom member 13. The inner end portion of the outer circumferential reinforcing metal 25 is bent and extended upward, and the resultant bent extended portion 32 is enclosed with the rubber member 33 integral with the diaphragm. This bent extended portion 32 is engaged with the inner side of a lower portion of the circumferential wall 24 of the partition 7. An air chamber 38 is formed between the diaphragm 6 and bottom member 13.

In order to assemble this vibration isolator 1, the cylindrical trunk portion 14 is set in a liquid tank with the lower end opened portion thereof directed upward, and the partition 7 is inserted into this opened portion, the folded portion 27 at the inserting free end section of the circumferential wall 24 being press fitted or elastically inserted into the groove 20 of the vibration isolating base member 4. The diaphragm 6 is then fixed to the resultant product, and a combination of these parts is taken out into the atmosphere. After the residual liquid on this product has been removed, the fastened portion 16 is caulked to complete the assembling operation.

In this assembling operation, the upper end portion of the circumferential wall 24 of the partition 7 is put in an engaged state with respect to the groove 20 of the vibration isolating base member 4 by pressure fitting or inserting the former into the latter, so that the radial and vertical positioning of the partition 7 can be done with a high accuracy. Consequently, the cross-sectional area of the orifice 18 enclosed with the partition 7, vibration isolating base member 4 and liquid chamber-forming rubber portion 22 can be set to a desired level, and excellent vibration damping characteristics can be obtained.

Figure 4:
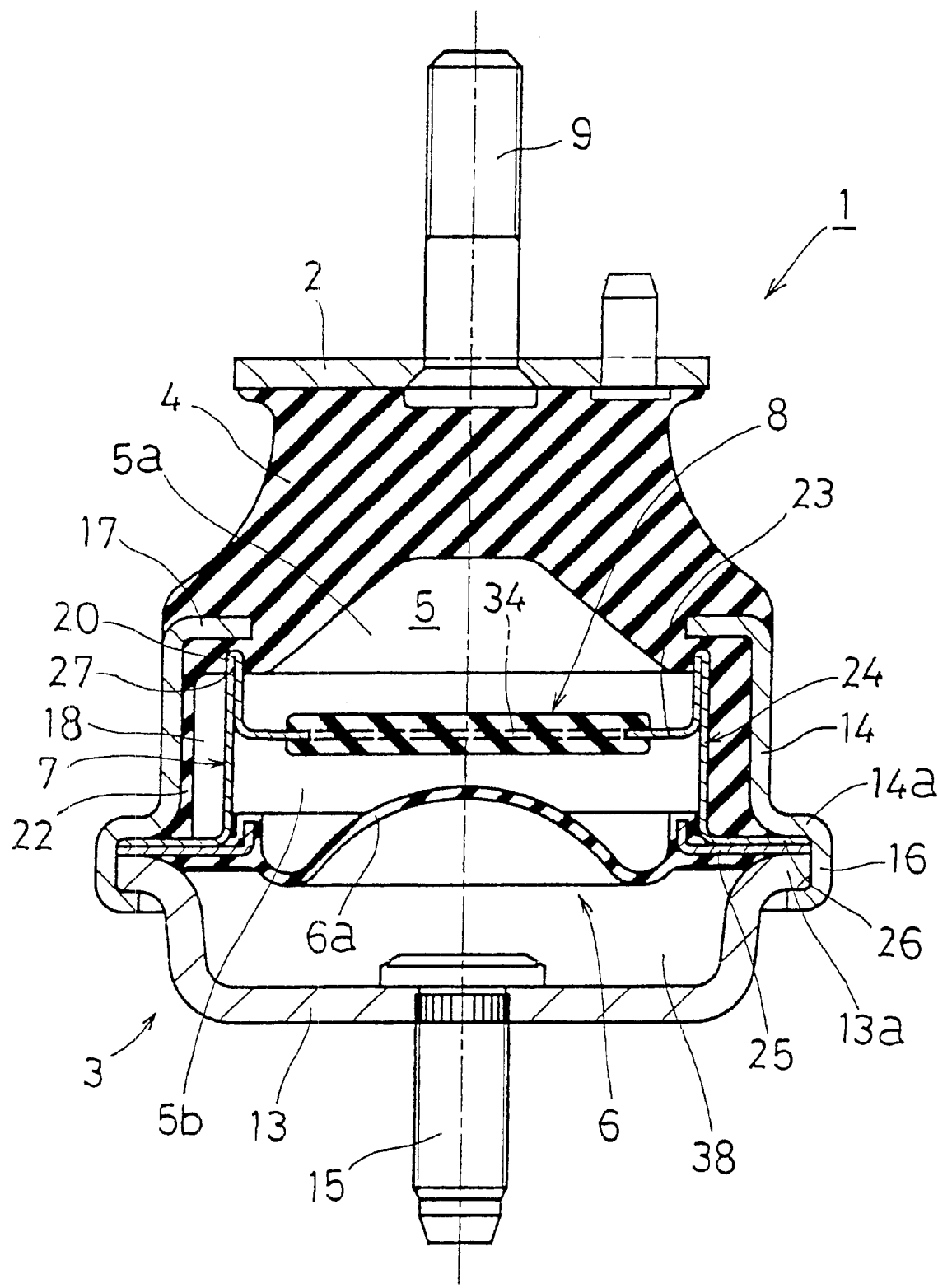
FIG. 4 is a longitudinal sectional view showing a second mode of embodiment of the liquid sealed type vibration isolator according to the first-mentioned invention.

FIG. 4 shows a second mode of embodiment of the first-mentioned invention, in which main parts of the construction identical with that of the corresponding parts of the above-described first mode of embodiment are designated by the same reference numerals.

In this mode of embodiment, an opening 34 is formed when a dynamic spring constant in a high-frequency region (especially, an engine noise region) requires to be reduced, in a central flat portion 23 of a partition 7, and an elastic film 8 of a rubber-like material is vulcanization bonded to the partition 7 so as to cover the opening. Owing to the effect of this elastic film 8, the dynamic spring constant in the high-frequency region (especially, an engine noise frequency) can be reduced. The construction and effects of the parts other than those referred to above are identical with those of the corresponding parts of the first-mentioned embodiment.

Figure 5:
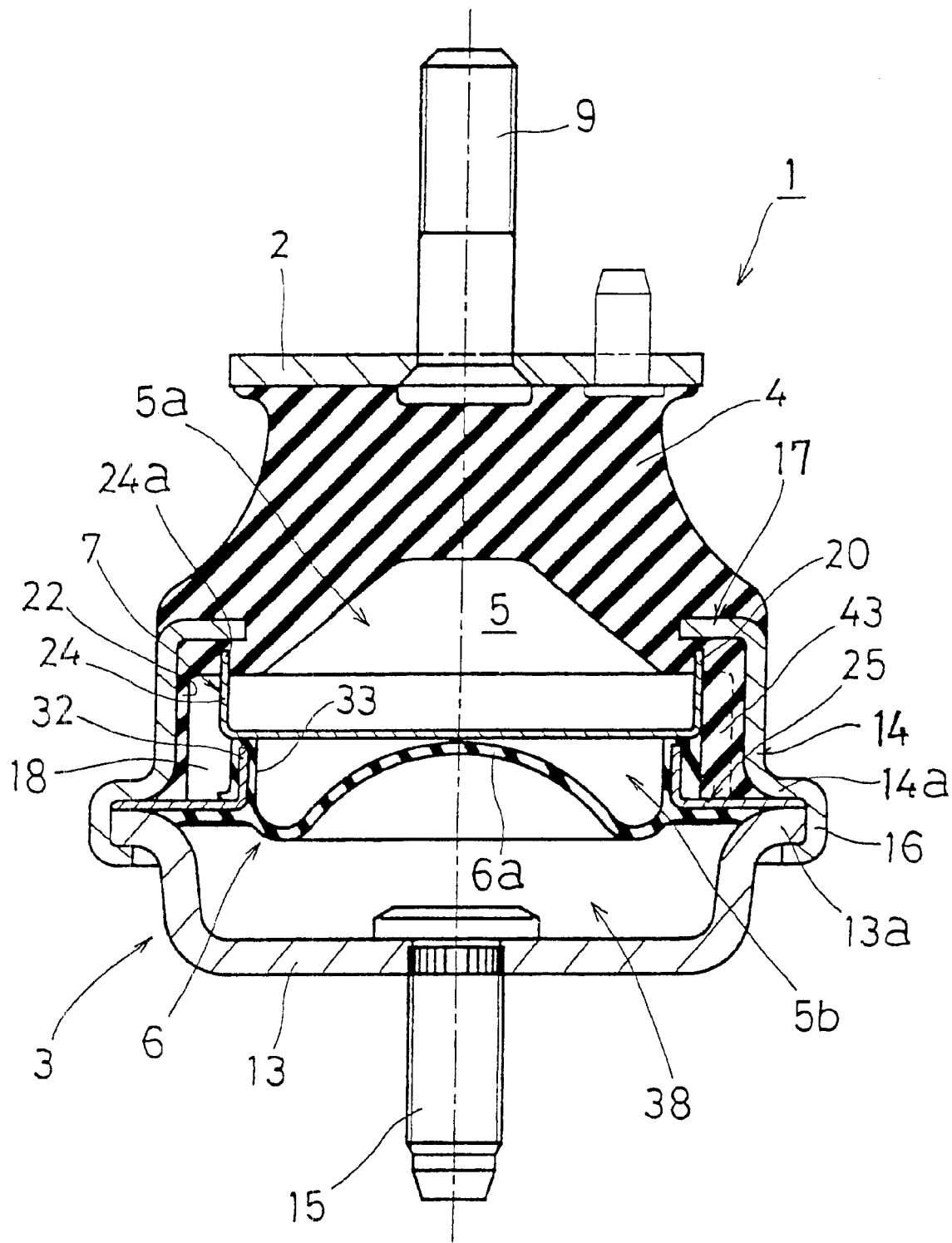
FIG. 5 is a longitudinal sectional view showing a third mode of embodiment of the liquid sealed type vibration isolator according to the first-mentioned invention.
Figure 6:
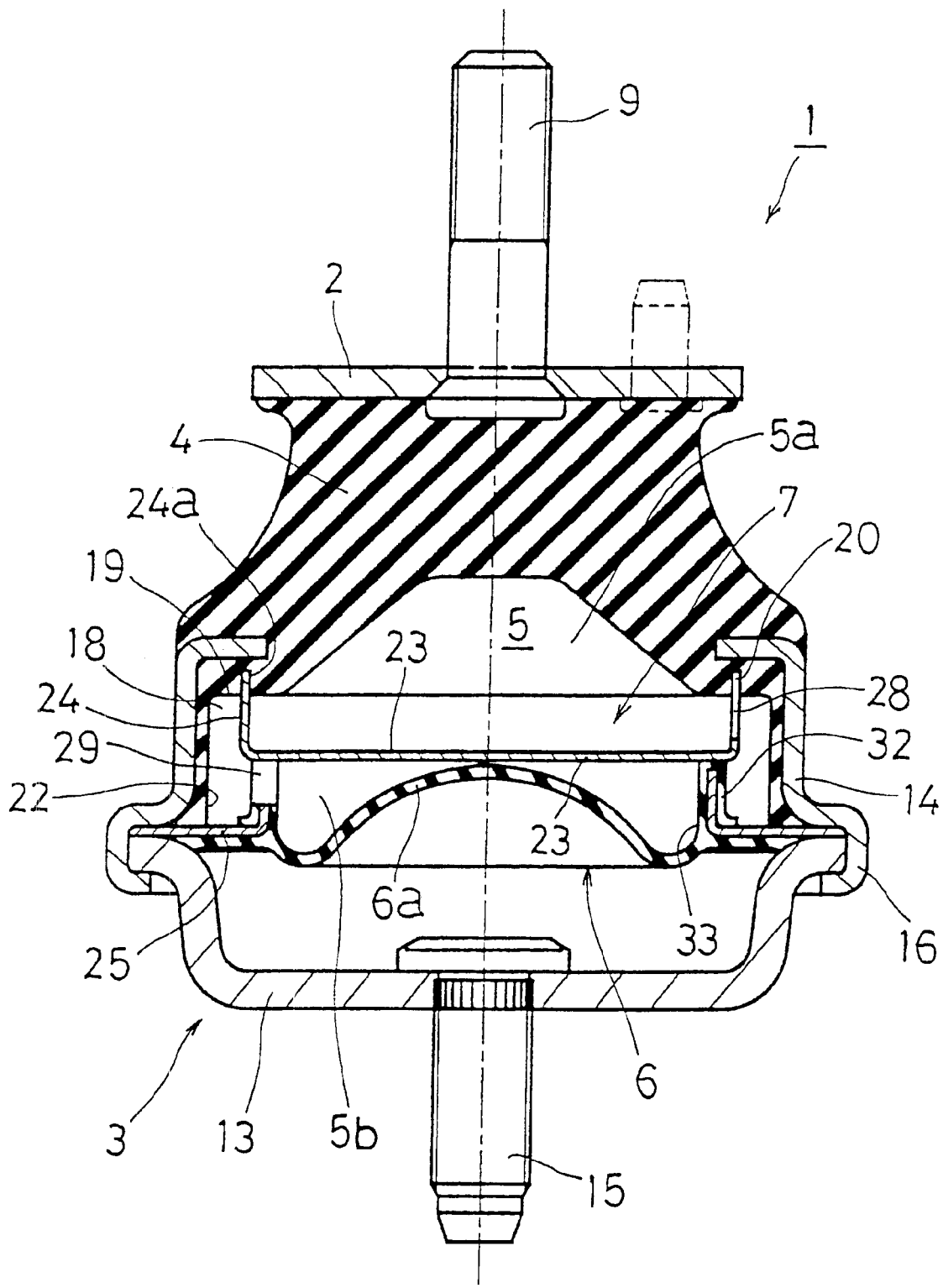
FIG. 6 is a longitudinal view of the same embodiment taken along a different plane.

FIG. 5 shows a third mode of embodiment of the first-mentioned invention, and FIG. 6 a longitudinal sectional view of the same embodiment taken along a different plane, the main parts of this embodiment the construction of which is identical with that of the corresponding parts of the above-described embodiment being designated by the same reference numerals.

The vibration isolator 1 of this mode of embodiment is formed by utilizing as orifice-forming members a flat surface portion 19 and liquid chamber-forming rubber portion 22 of the vibration isolating base member, partition 7 and an outer circumferential reinforcing metal member 25 of a diaphragm.

The partition 7 is obtained by pressing or deep drawing one piece of disc type metal plate into a bent product, which has a shape of a, tray and includes a disc type central flat portion 23, and a circumferential wall 24 formed in a bent state so as to extend upward from an outer circumferential part of the flat portion 23 and define an upper half of an inner circumferential surface of the orifice. An upper end portion of the circumferential wall 24 extends to a position higher than the flat surface portion 19 of a liquid chamber-side circumferential edge section of the vibration isolating base member 4, and a resultant upwardly extended portion 24a is press fitted or inserted into an annular groove 20 formed in the vibration isolating base member 4, whereby the partition is positioned. The circumferential wall 24 is provided with an opening 28 therethrough which communicates the main liquid chamber 5a and orifice 18 with each other.

An inner end portion of the outer circumferential reinforcing metal member 25 of the diaphragm 6 is bent and extended upward, and a resultant bent and extended portion 32 is covered at its circumferential part with a rubber member 33, via which an upper end of the bent and extended portion 32 is elastically engaged with a lower surface (on the side of the diaphragm) of the central flat portion 23 of the partition 7. The bent extended portion 32 is provided with an opening 29 therethrough which communicates the orifice 18 and auxiliary chamber 5b with each other. The outer circumfential reinforcing metal member 25 of the diaphragm 6 constitutes a bottom surface of the orifice, and an outer end portion of the reinforcing metal member is caulked to a fastened portion 16 of the lower metal fixing member 3. The construction of the other parts is substantially identical with that of the corresponding parts of the first embodiment.

In order to assemble this vibration isolator, a cylindrical trunk portion 14 is set in a liquid tank with a lower end opened portion thereof directed upward in the same manner as in the first mode of embodiment, and the partition 7 is inserted into the opened end portion. A free end portion (extended portion 24a), with respect to the direction of the insertion of the partition, of the circumferential wall 24 is then press fitted or inserted into the groove 20 of the vibration isolating base member 4, and the diaphragm 6 is fixed. The resultant product is then taken out into the atmosphere, and the residual liquid is regulated, the fastened portion 16 being then caulked to complete the assembling work.

In this case, the partition 7 is formed to a simple tray-like shape in which the circumferential wall 24 stands up on an outer circumferential part of the central flat portion 23. Therefore, the partition 7 has various advantages, i.e., it has a simple construction, and is molded easily. Moreover, the partition can be positioned by merely press fitting or inserting the upper end extended portion 24a of the circumferential wall 24 thereof into the groove 20 of the vibration isolating base member 4, and can easily set the orifice 18 having a desired cross section.

Figure 7:
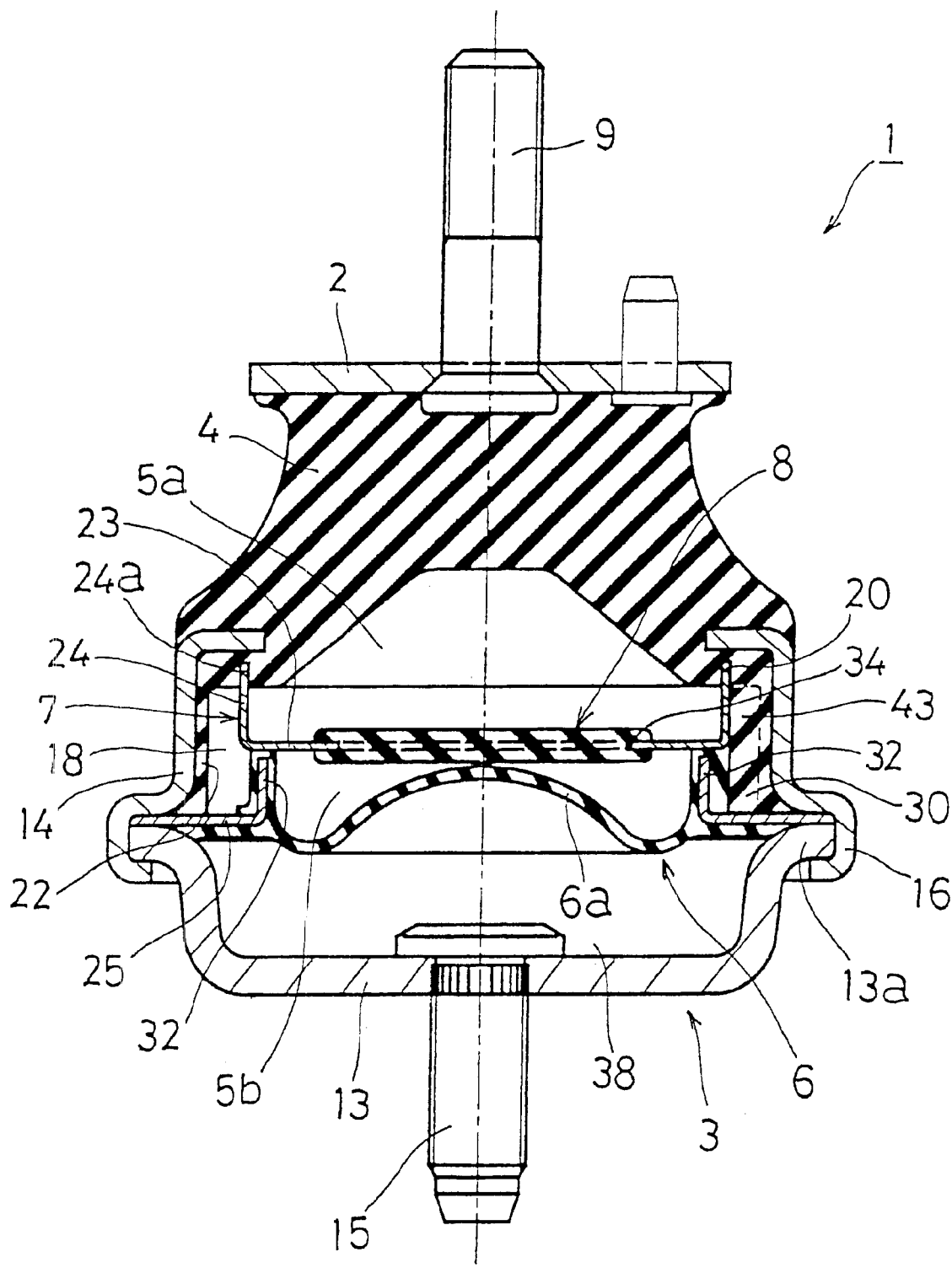
FIG. 7 is a longitudinal sectional view showing a fourth mode of embodiment of the liquid sealed type vibration isolator according to the first-mentioned invention.

FIG. 7 shows a fourth mode of embodiment of the first-mentioned invention, and the main parts thereof the construction of which is identical with that of the corresponding parts of the above-described modes of embodiments are designated by the same reference numerals.

In the vibration isolator 1 of the fourth embodiment, an opening 34 is formed in a central flat portion 23 of the partition 7, and an elastic film 8 is vulcanization bonded to the partition so as to cover the opening 34, the vibration isolator being made capable of effectively reducing a dynamic spring constant in a high-frequency region (especially, an engine noise region) by an operation of the elastic film 8. The construction and effects of the other parts are identical with those of the corresponding parts of the above-described third mode of embodiment.

Figure 8:
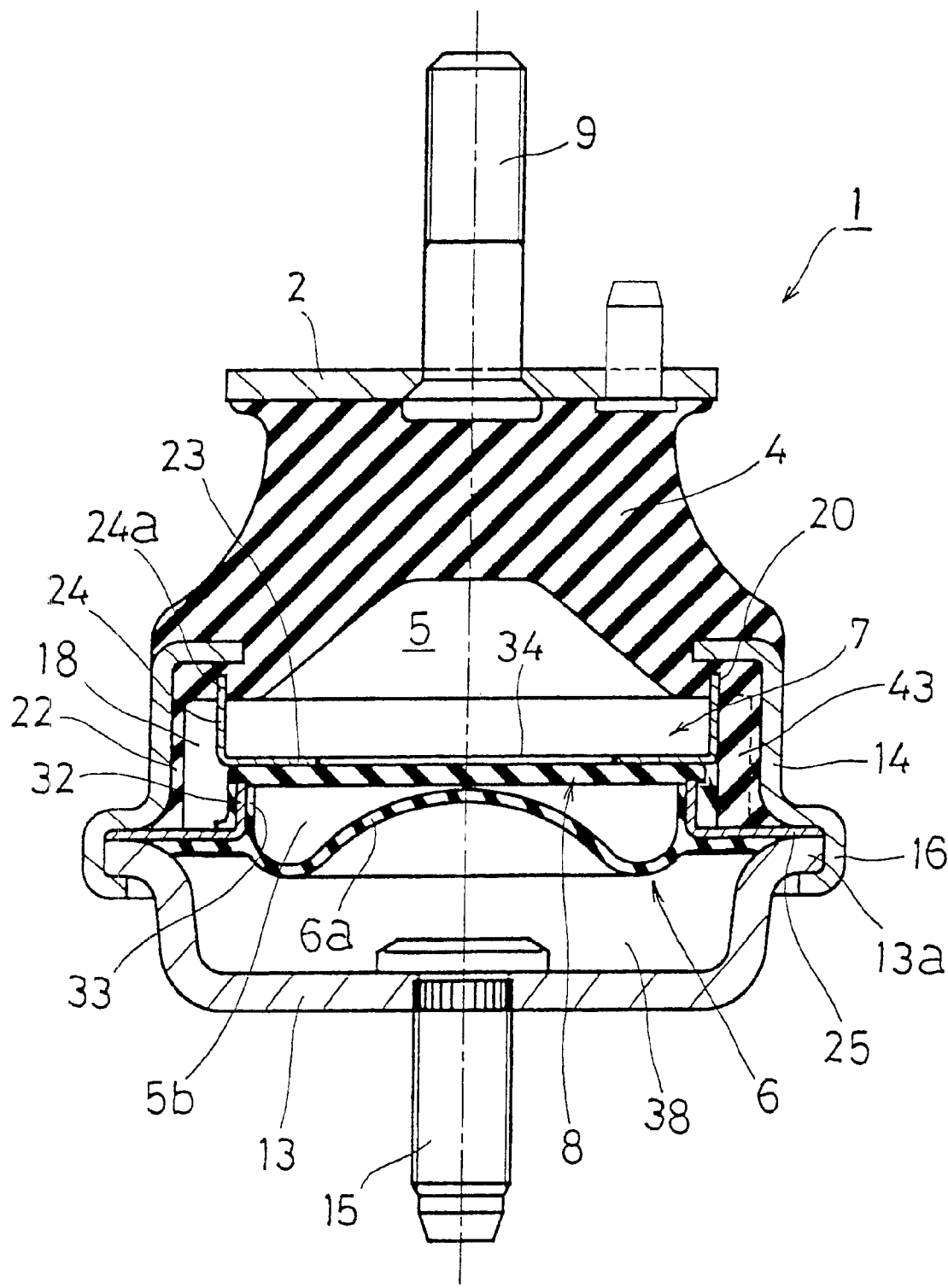
FIG. 8 is a longitudinal sectional view showing a fifth mode of embodiment of the liquid sealed type vibration isolator according to the first-mentioned invention.

FIG. 8 is a longitudinal sectional view showing a fifth embodiment of the first-mentioned invention, the main parts the construction of which is identical with that of the corresponding parts of the above-described modes of embodiments are designated by the same reference numerals.

In the vibration isolator 1 of the fifth embodiment, an opening 34 is formed in a central flat portion 23 of a partition 7, and an upper end of a bent portion 32 of an outer circumferential reinforcing metal member 25 of the diaphragm 6 and the partition 7 sandwich an elastic film 8 so as to cover the opening, to thereby enable a dynamic spring constant in a high-frequency region (especially, an engine noise region) to be reduced effectively. The construction and effects of the other parts are identical with those of the corresponding parts of the third mode of embodiment.

Figure 9:
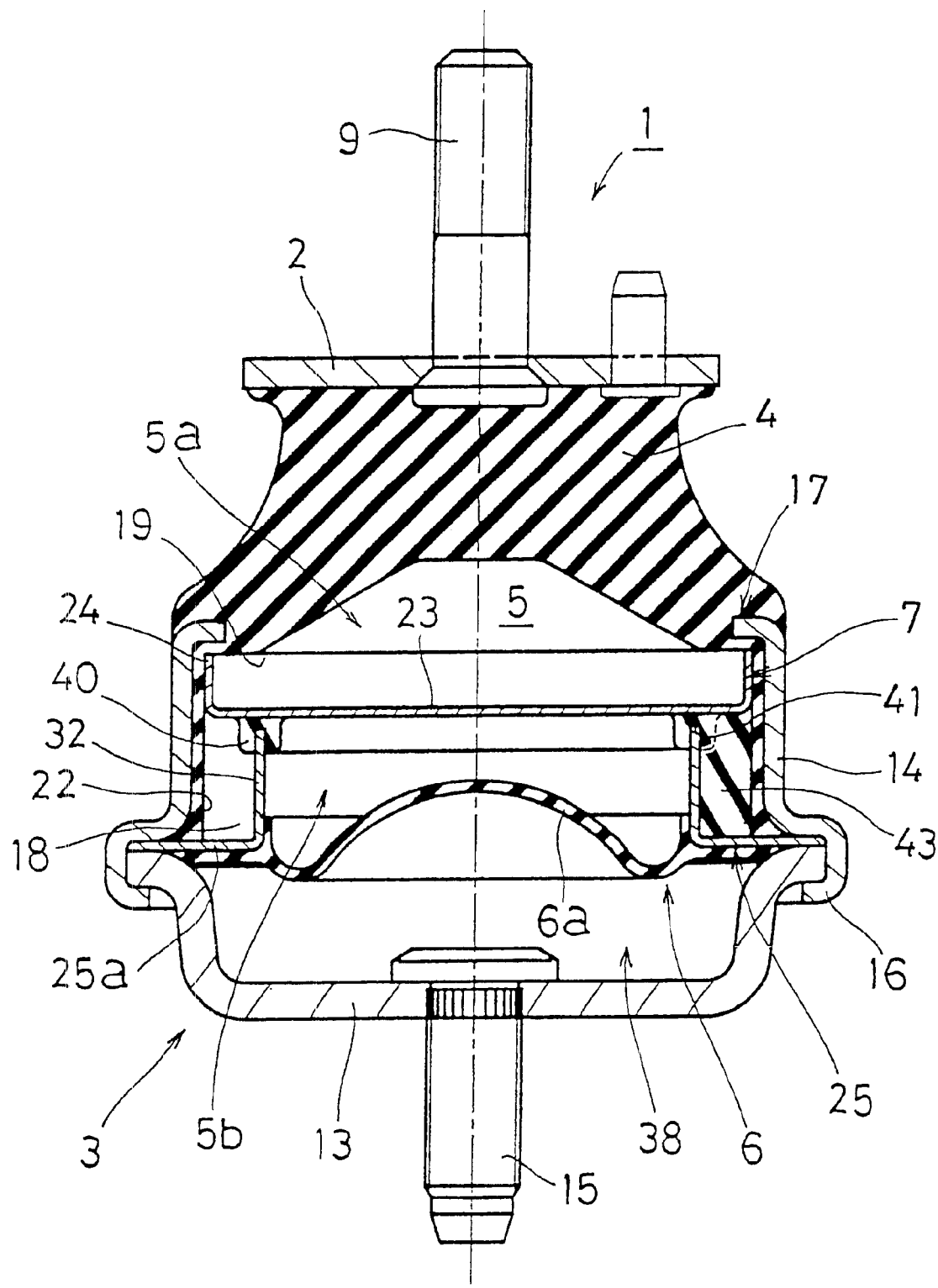
FIG. 9 is a longitudinal sectional view showing a sixth mode of embodiment of the liquid sealed type vibration isolator according to the first-mentioned invention.
Figure 10:
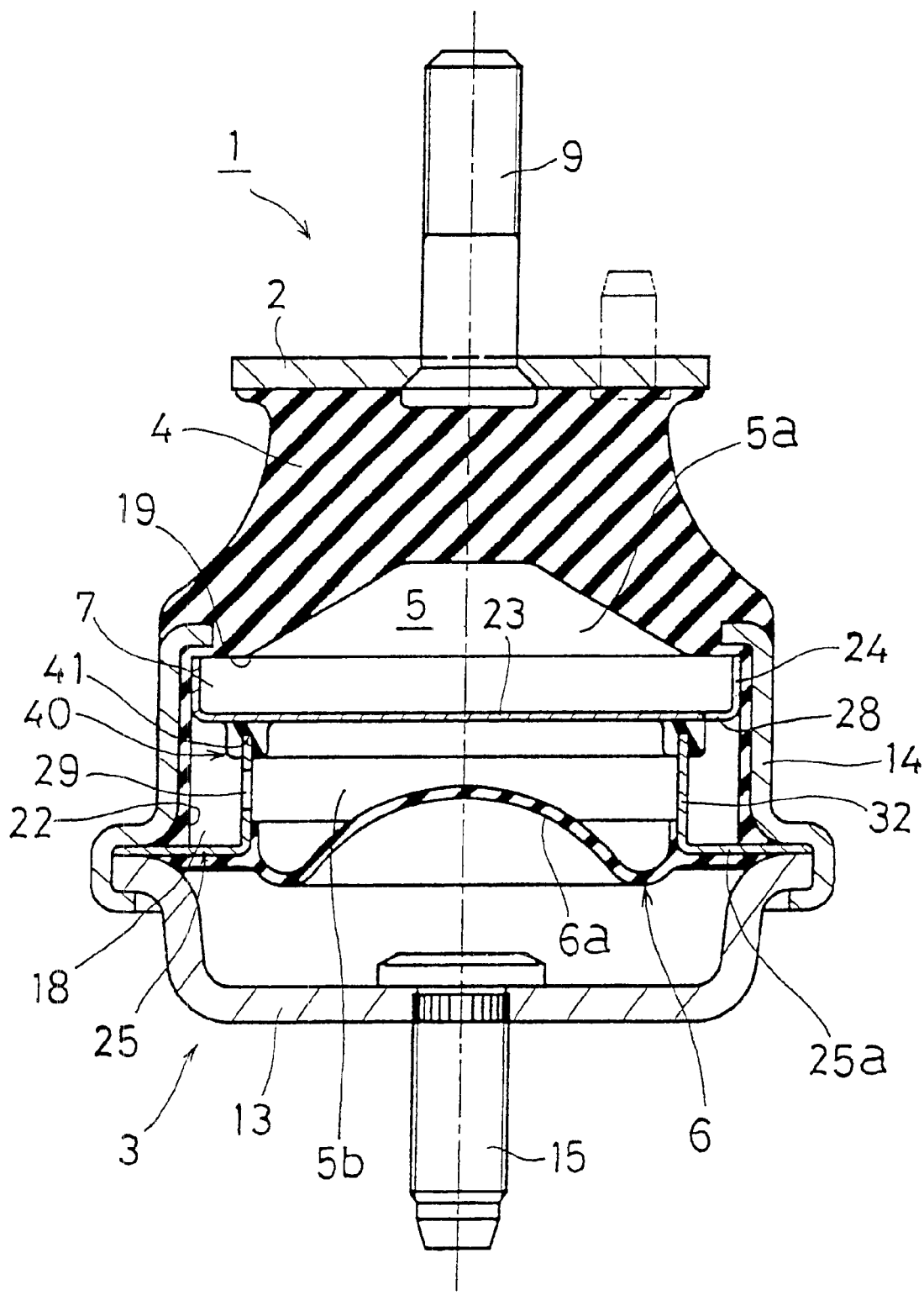
FIG. 10 is a longitudinal sectional view of the same embodiment taken along a different plane.

FIG. 9 is a longitudinal sectional view showing a sixth embodiment of the first-mentioned invention, and FIG. 10 a longitudinal sectional view of the same embodiment taken along a different plane. In this embodiment, the structural parts identical with those of the above-described embodiments are also designated by the same reference numerals.

In the sixth embodiment, a cross-sectionally rectangular orifice 18 is formed by a liquid chamber-forming rubber portion 22 defining an outer circumferential surface of the orifice, a partition 7 defining an upper surface thereof, and an outer circumferential reinforcing metal member 25 of a diaphragm 6 which defines an inner circumferential and bottom surfaces thereof.

The partition 7 is formed by pressing or deep drawing one piece of metal plate into tray-like structure including a disc type central flat portion 23, and a circumferential annular wall 24 standing up from an outer circumferential section of the central flat portion 23.

The outer circumferential section 24 of this partition 7 is press fitted into an inner circumferential section of the liquid chamber-forming rubber portion 22, and an upper end thereof is engaged with the flat surface portion 19 of a liquid chamber-side circumferential edge section of a vibration isolating base member 4.

An outer circumferential reinforcing metal member 25 of the diaphragm 6 includes a ring-shaped bottom portion 25a caulked at an outer end section thereof to a fastened portion of a lower metal fixing member 3, and a cylindrical portion 32 extended in a bent state and standing up from an inner end of the bottom portion and forming an inner circumferential surface of the orifice, an upper end section of the bent extended portion 32 being press fitted or inserted in an annular groove 41 of a rubber member 40 annularly vulcanization bonded to a lower surface of the central flat portion 23 of the partition 7. Owing to this arrangement, joint surfaces of the partition 7 and the outer circumferential reinforcing metal member 25 of the diaphragm are sealed, and a space enclosed with these parts and liquid chamber-forming rubber portion 22 functions as the orifice 18.

The central flat portion 23 of the partition 7 is provided at an outer circumferential section thereof with an opening 28 communicating with a main liquid chamber 5a, while the outer circumferential reinforcing metal member 25 of the diaphragm 6 is provided at an inner circumferential portion 32 thereof with an opening 29 communicating with an auxiliary liquid chamber 5b. A partition wall 43 for preventing these openings 28, 29 from being short-circuited is molded so as to become integral with a part of a circumferential portion of the rubber member 40 vulcanization bonded to a lower surface of the partition 7. The construction of the remaining parts is identical with the corresponding parts of the first mode of embodiment.

In order to assemble this vibration isolator 1, a cylindrical trunk portion 14 is set in a liquid tank with a lower end opened part thereof directed upward, and an inserting free end section of the partition 7 is engaged with the flat surface portion 19 of the vibration isolating base member 4 as the partition 7 is press fitted into the base member along the liquid chamber-forming rubber member 22. The diaphragm 6 is then fixed, and an upper end section of the bent extended portion 32 of an inner end part of the outer circumferential reinforcing metal member 25 is press fitted or inserted into the groove 41 of the annular rubber member 40 on the lower surface of the partition 7. A combination of these parts is then taken out, and the residual liquid is regulated, the fastened portion 16 being thereafter caulked.

Although, in this case, the partition 7 is formed by merely standing up the outer circumferential part of the central flat portion 23 and has a simple shape, the circumferential wall 24 thereof is in pressure contact with the liquid chamber-forming rubber portion 22 with the upper end thereof engaged with the flat surface portion 19 of the vibration isolating base member 4, whereby the radial and vertical positioning of the partition 7 is done. Moreover, the circumferential wall 24 of the partition 7 functions as a rib, and the rigidity of the partition 7 can thereby be secured, so that variation of the cross-sectional area of the orifice due to vibration can also be prevented. Since the outer circumferential reinforcing metal member 25 of the diaphragm 6 includes the bottom portion 25a, and cylindrical bent extended portion 32 standing up from the inner end of the bottom portion, and has also a simple shape, a molding operation therefor by deep drawing work or pressing work can be carried out easily.

Figure 11:
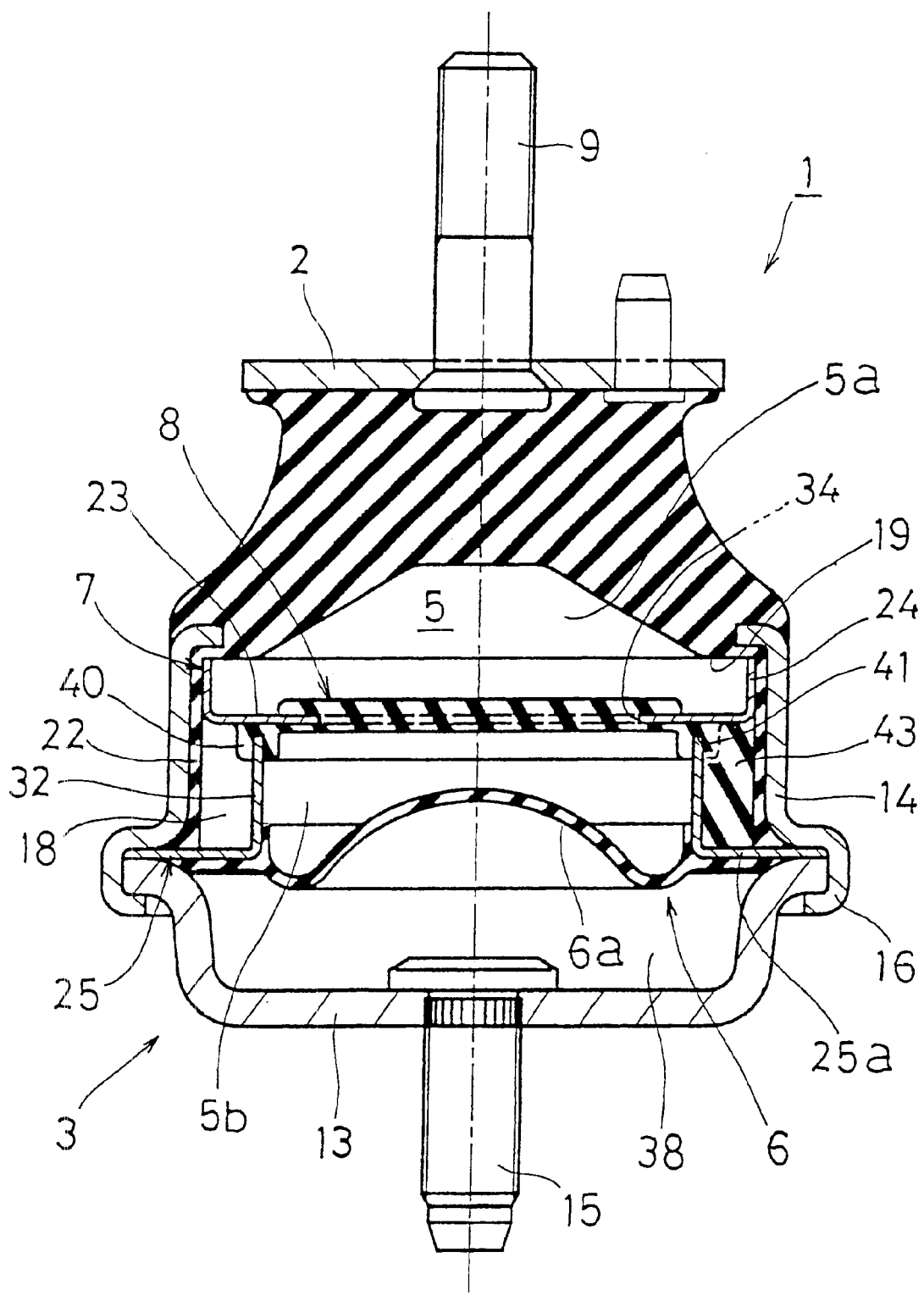
FIG. 11 is a longitudinal sectional view of a seventh mode of embodiment of the liquid sealed type vibration isolator according to the first-mentioned invention.

FIG. 11 is a longitudinal sectional view showing a seventh mode of embodiment of the first-mentioned invention, in which the main parts the construction of which is identical with that of the corresponding parts in the above-described modes of embodiments are designated by the same reference numerals.

In the vibration isolator in the seventh embodiment, an opening 34 is formed in a central flat portion 23 of a partition 7, and an elastic film 8 is vulcanization bonded to the central flat portion so as to cover the opening, whereby a dynamic spring constant in a high-frequency region (especially, an engine noise region) can be effectively reduced. This elastic film 8 is vulcanization molded so that it becomes integral with a rubber member 40 and a partition wall 43 which are formed on a lower surface of the partition 7. The construction and effects of the other parts are identical with those of the corresponding parts of the sixth embodiment.

Figure 12:
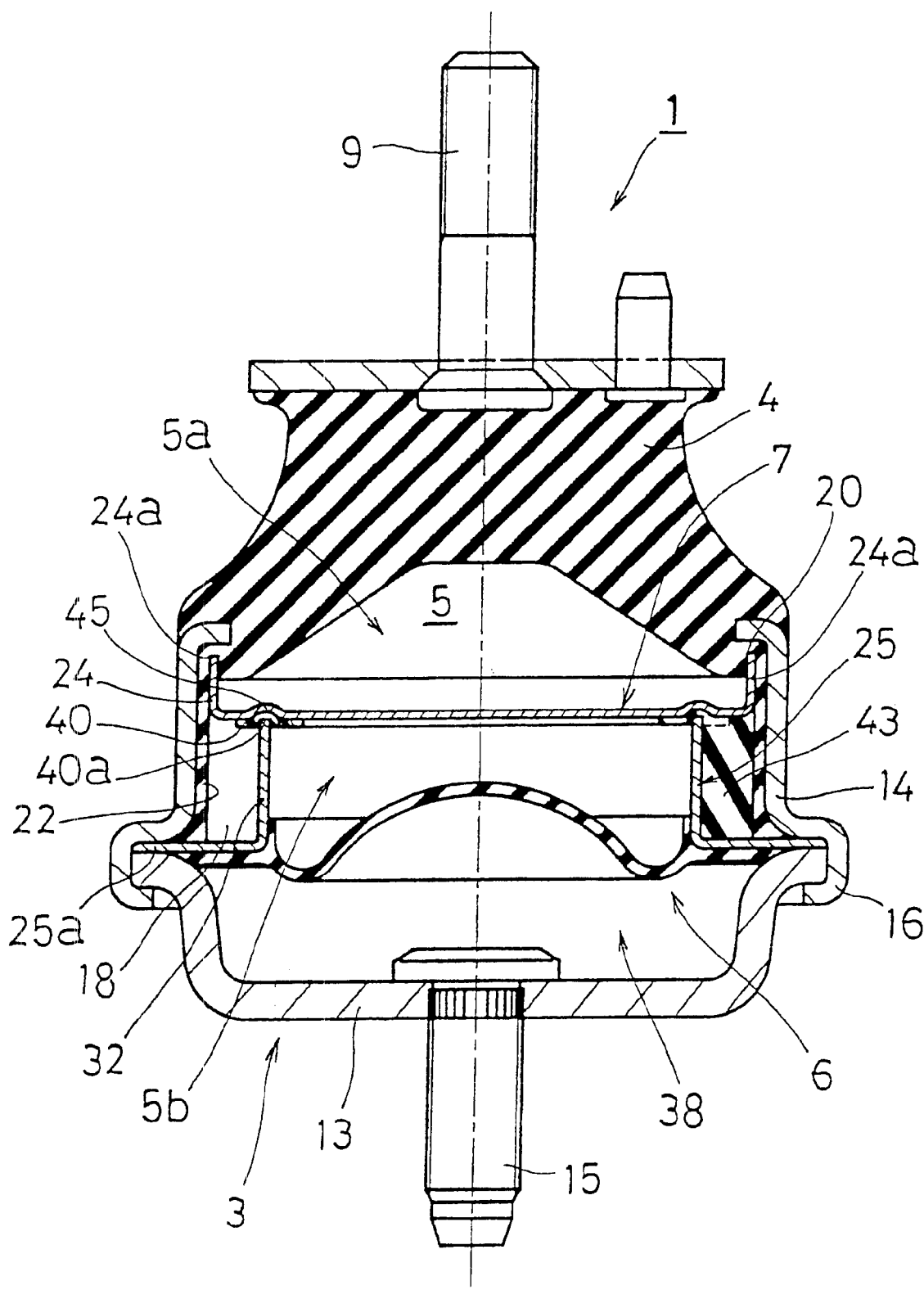
FIG. 12 is a longitudinal sectional view of an eighth mode of embodiment of the liquid sealed type vibration isolator according to the first-mentioned invention.
Figure 13:
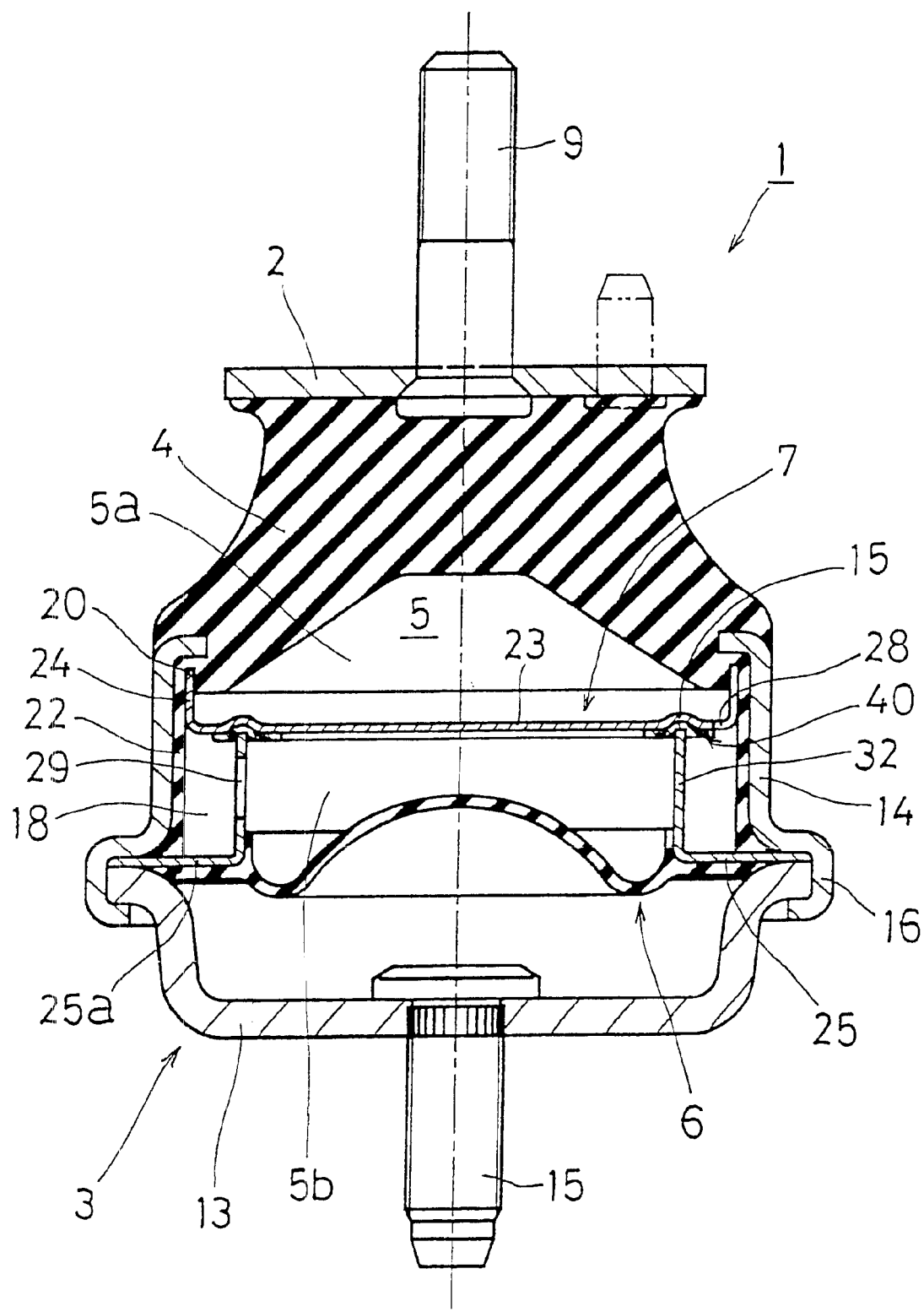
FIG. 13 is a longitudinal sectional view of the same embodiment taken along a different plane.

FIG. 12 is a longitudinal sectional view showing an eighth mode of embodiment of the first-mentioned invention, and FIG. 13 a longitudinal sectional view of the same embodiment taken along a different plane. The main parts the construction of which is identical with that of the corresponding parts of the above-described modes of embodiments are designated by the same reference numerals.

A vibration isolator 1 of the eighth mode of embodiment is basically substantially identical with the vibration isolator of the sixth mode of embodiment, i.e., in the eighth embodiment, a cross-sectionally rectangular orifice 18 is formed of a liquid chamber-forming rubber portion 22 defining an outer circumferential surface of the orifice, a partition 7 defining an upper surface thereof, and an outer circumferential reinforcing metal member 25 of a diapharm which defines an inner circumferential and bottom surfaces thereof. However, the construction of a device for positioning the partition 7, and that of joint portions of the partition 7 and outer circumferential reinforcing metal member 25 are different from those of the corresponding parts of the sixth mode of embodiment.

Concretely speaking, the partition 7 is formed to a tray-like shape in the same manner as in the sixth mode of embodiment. A circumferential wall 24 of the partition is press fitted in an inner curcumferential section of the liquid chamber-forming rubber portion 22, and an upper end extended part 24a thereof is press fitted or inserted into an annular groove 20 formed in a boundary section between a flat surface portion 19 of a liquid chamber-side circumferential part of a vibration isolating base member 4 and the liquid chamber-forming forming rubber portion 22, whereby the partition is positioned. An annular groove 45 is further provided in a lower surface of an outer circumferential section of a central flat portion 23 of the partition 7, and a thin film type rubber member 40 is vulcanization bonded to the partition along the annular groove 45, the rubber member having a cross-sectionally groove-shaped portion in conformity with the groove 45 of the partition 7.

The construction of an outer circumferential reinforcing metal member 25 of a diaphragm 6 is also identical with that of the same member in the sixth mode of embodiment, and an upper end section of an upwardly bent extended portion 32 of an inner end part thereof is press fitted into an annular groove 40a of the rubber member 40 on the lower surface of the partition 7. Owing to this arrangement, joint surfaces of the partition 7 and outer circumferential reinforcing metal member 25 are sealed, and a space enclosed with these parts and liquid chamber-forming rubber portion 22 functions as an orifice 18. The construction of the other parts is identical with that of the corresponding parts of the sixth mode of embodiment.

In order to assemble this vibration isolator 1, a cylindrical trunk portion 14 is set in a liquid tank with a lower end opened section directed upward, and an inserting free end extended part thereof is press fitted or inserted into the groove 20 of the flat surface portion 19 of the vibration isolating base member 4 as the partition 7 is press fitted into the vibration isolating base member 4 along the liquid chamber-forming rubber portion 22. A diaphragm 6 is then fixed, and an upper end section of the bent extended portion 32 at an inner end part of the outer circumferential reinforcing metal member 25 is engaged with the groove 40a of the rubber member 40 of the partition 7. The resultant product is taken out into the atmosphere, and the residual liquid is regulated, a fastener portion 16 being caulked to complete the assembling work.

Although, in this case, the partition 7 is formed by merely standing up the outer circumferential edge section of the central flat portion and has a simple shape, the outer circumferential wall 24 is in pressure contact with the liquid chamber-forming rubber portion 22 with the upper end part thereof engaged with the groove 20 of the vibration isolating base member 4 in a press fitted or inserted state. Therefore, the radial and vertical positioning of the partition 7 can be done in more desirable manner than in the sixth mode of embodiment. The operation and effects of the other parts are identical with those of the corresponding parts of the sixth mode of embodiment.

Figure 14:
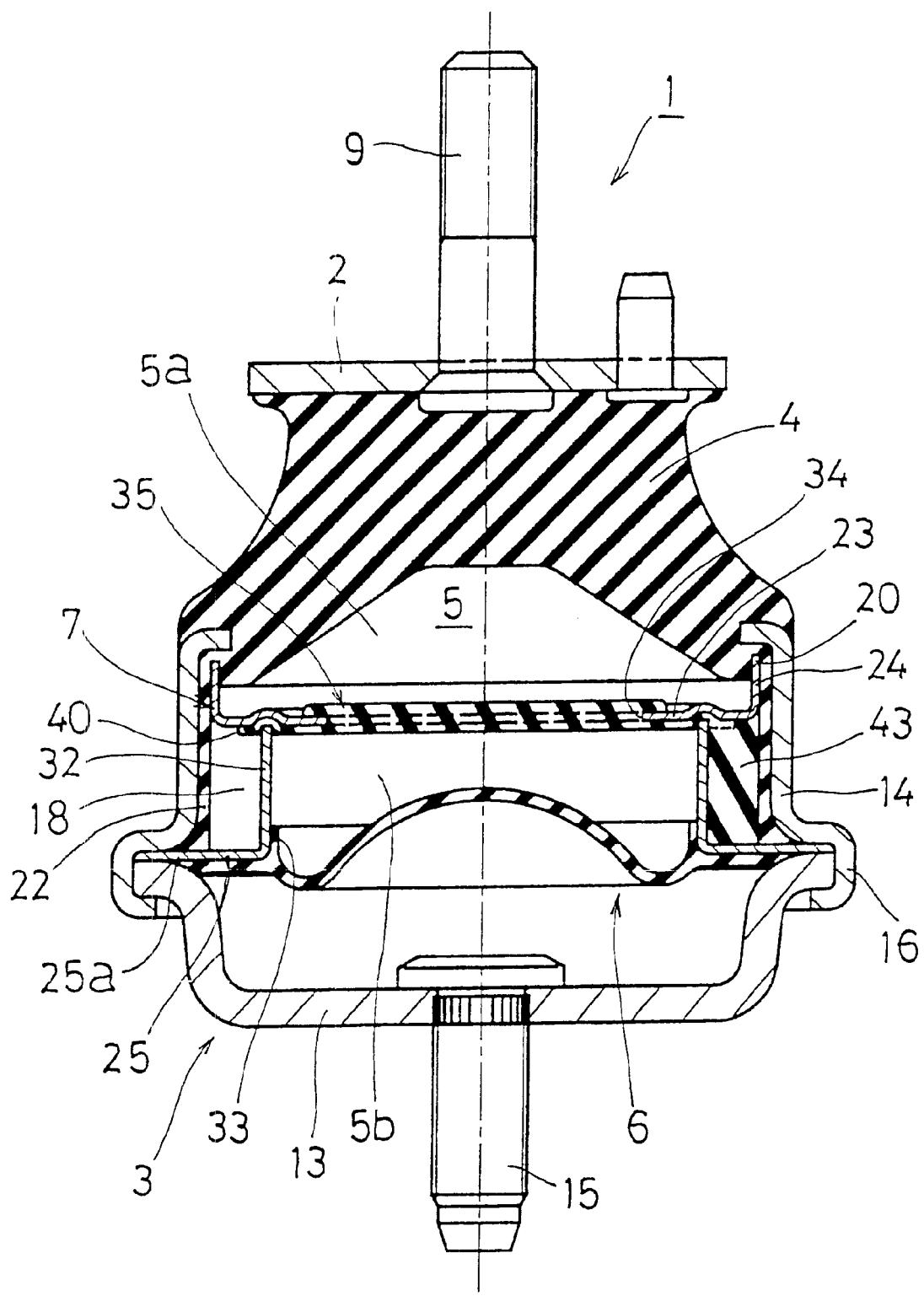
FIG. 14 is a longitudinal sectional view of a ninth mode of embodiment of the liquid sealed type vibration isolator according to the first-mentioned invention.

FIG. 14 is a longitudinal sectional view showing a ninth mode of embodiment of the first-mentioned invention, in which the main parts the construction of which is identical with that of the corresponding parts of the above-described modes of embodiments are designated by the same reference numerals.

In the ninth mode of embodiment, an opening 34 is formed in a central flat portion 23 of the partition 7 with an elastic film 8 vulcanization bonded to the partition so as to cover the opening 34 in the same manner as in the seventh mode of embodiment. Accordingly, a dynamic spring constant in a high-frequency region (especially, an engine noise region) can be effectively reduced. This elastic film 8 is vulcanization molded so that the film becomes integral with a rubber member 40 and a partition wall 43 which are on a lower surface of the partition 7. The construction and effects of the other parts are identical with those of the corresponding parts of the eighth mode of embodiment.

Figure 15:
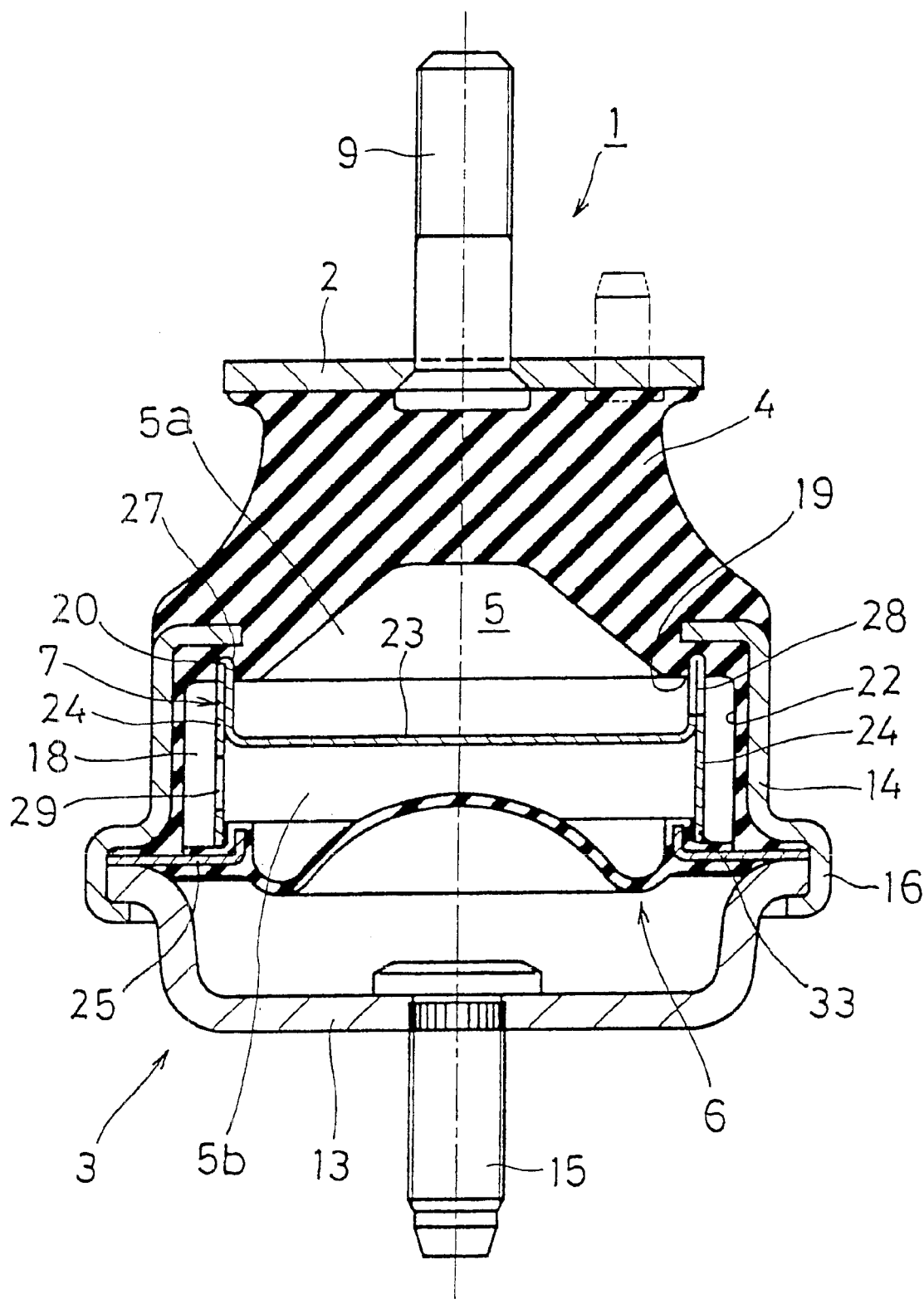
FIG. 15 is a longitudinal sectional view of a tenth mode of embodiment of the liquid sealed type vibration isolator according to the first-mentioned invention.

FIG. 15 is a longitudinal sectional view showing a tenth mode of embodiment of the first-mentioned invention, in which the constituent parts the construction of which is identical with that of the corresponding parts of the above-described modes of embodiment are also designated by the same reference numerals.

In the vibration isolator of the tenth mode of embodiment, an orifice 18 is formed of a liquid chamber-forming rubber portion 22 defining an outer circumferential surface of the orifice, a liquid chamber-side flat surface portion 19 of a vibration isolating base member 4 which defines an upper surface thereof, a partition 7 defining an inner circumferential surface thereof, and an outer circumferential reinforcing metal member 25 of a diaphragm 6 which defines a bottom surface thereof. This mode of embodiment differs from the first mode of embodiment in the following points only. The outer circumferential reinforcing metal member 25 defines the bottom surface of the orifice. The partition 7 does not have a lower end flange. A lower end of a vertical circumferential wall 24 is engaged with an upper surface of the outer circumferential reinforcing metal member 25. The construction of the other portions is identical with the corresponding portions of the first mode of embodiment.

Concretely speaking, the partition 7 is formed by bending one piece of disc type metal plate by deep drawing or pressure molding, and includes a central flat portion 23, and a cylindrical circumferential wall 24 constituting a vertical wall surface and formed by bending an outer circumferential part of the central flat portion 23 upward, and then folding back the upwardly extending part downward, a lower end of this circumferential wall 24 being elastically engaged with a rubber member 33 in which the outer circumferential reinforcing metal member 25 is buried.

The partition 7 in this case is press fitted or inserted in a groove of a vibration isolating base member 4, and a lower end of the partition is elastically engaged with the outer circumferential reinforcing metal member 25 of the diaphragm, so that the radial and vertical positioning of the partition can be done with a high accuracy.

As described above, the first-mentioned invention has the following advantages. Since a partition press fitting or inserting structure with respect to a groove, or a surface engaging structure therefor is utilized in a joint portion between the partition 7 and the other orifice-forming member with the simplification of the construction of the orifice-forming partition and the facilitation of a partition molding process achieved, the positioning of the partition and the other orifice-forming member can be done easily.

Next, the modes of embodiments of the liquid sealed type vibration isolator of the second-mentioned invention will be described with reference to the drawings.

Figure 16:
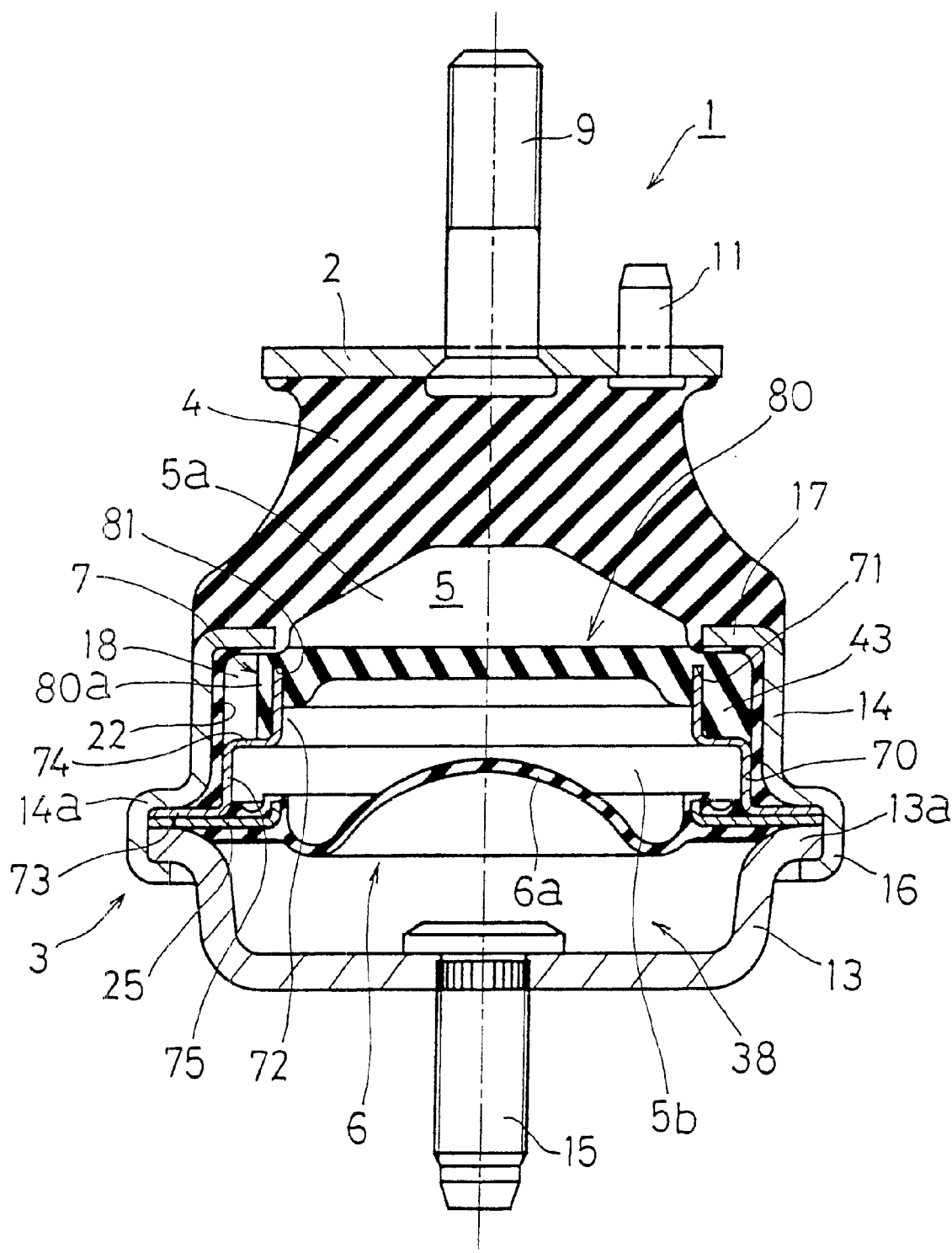
FIG. 16 is a longitudinal sectional view showing a first mode of embodiment of the liquid sealed type vibration isolator according to the second-mentioned invention.
Figure 17:
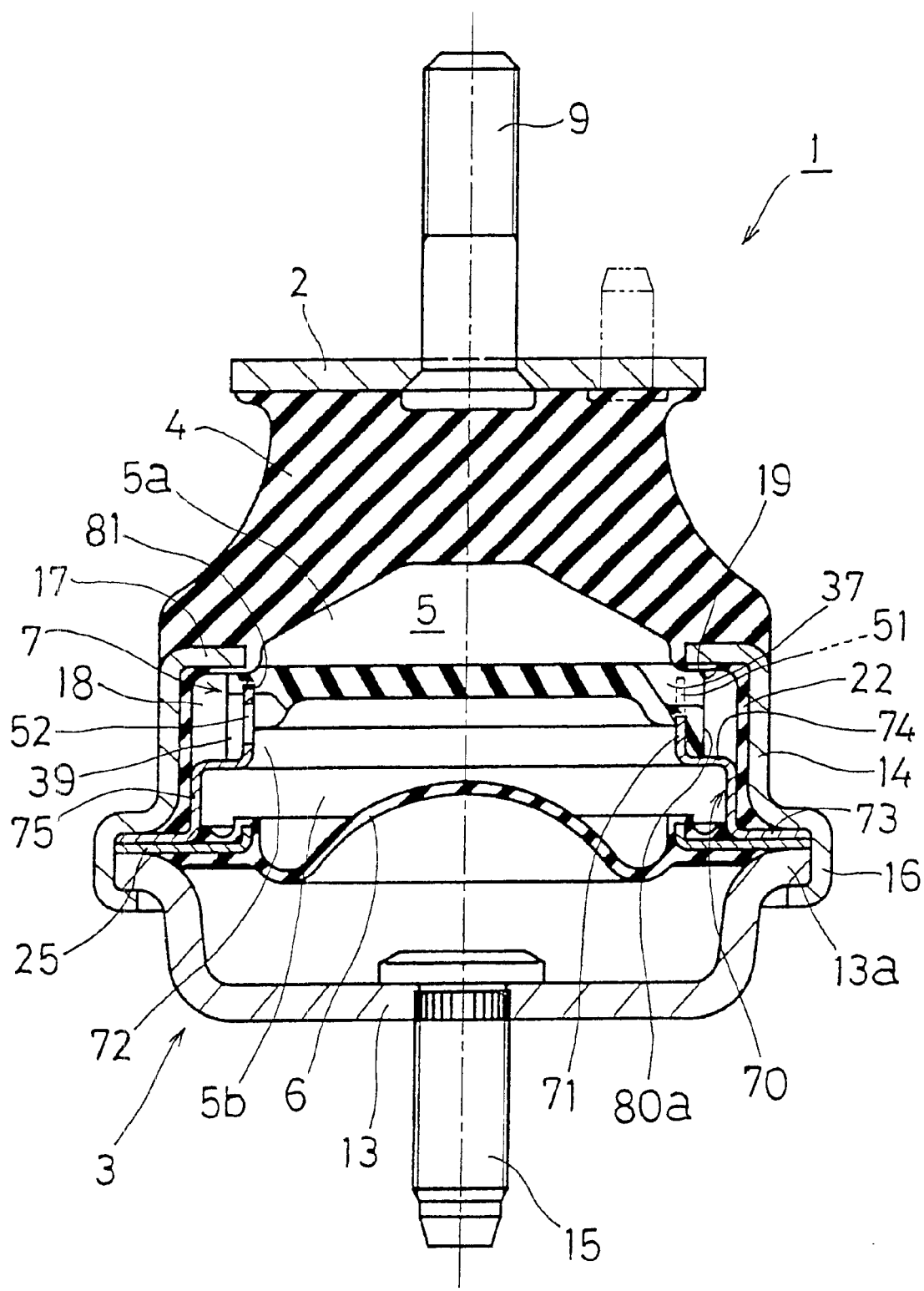
FIG. 17 is a longitudinal sectional view of the same vibration isolator taken along a different plane.
Figure 18:
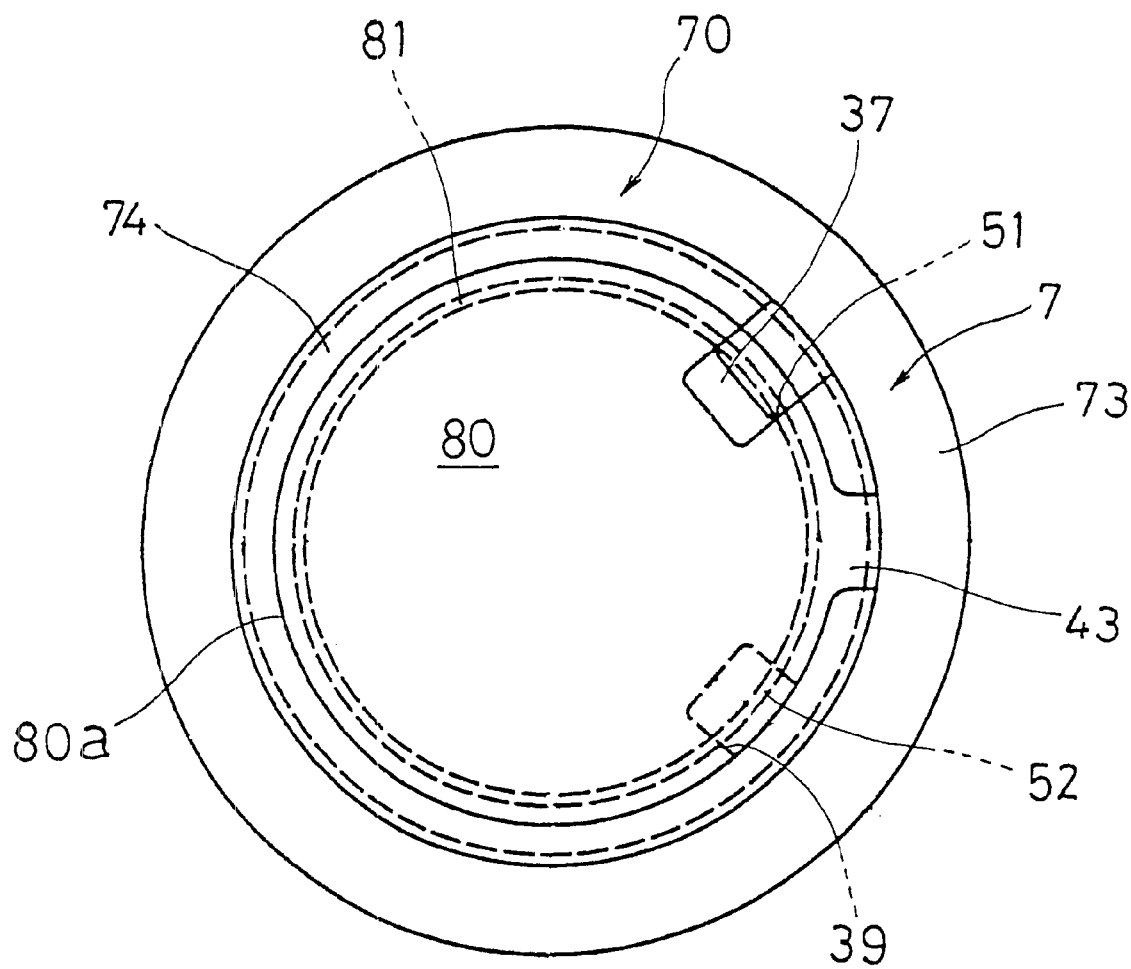
FIG. 18 is a plan view of a partition of the same vibration isolator.
Figure 19:
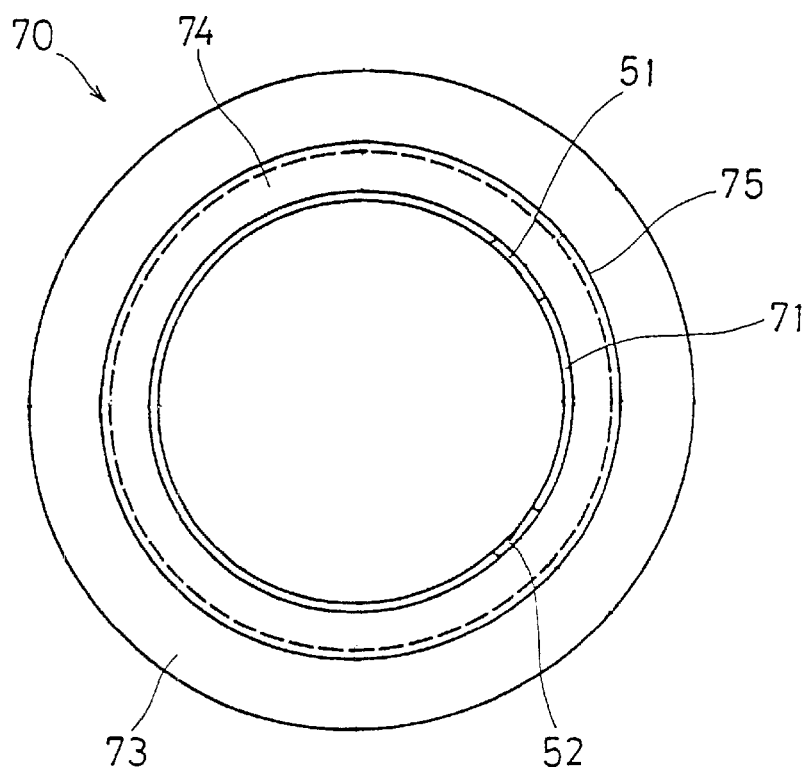
FIG. 19 is a plan view of a partition plate of the same vibration isolator.
Figure 20:
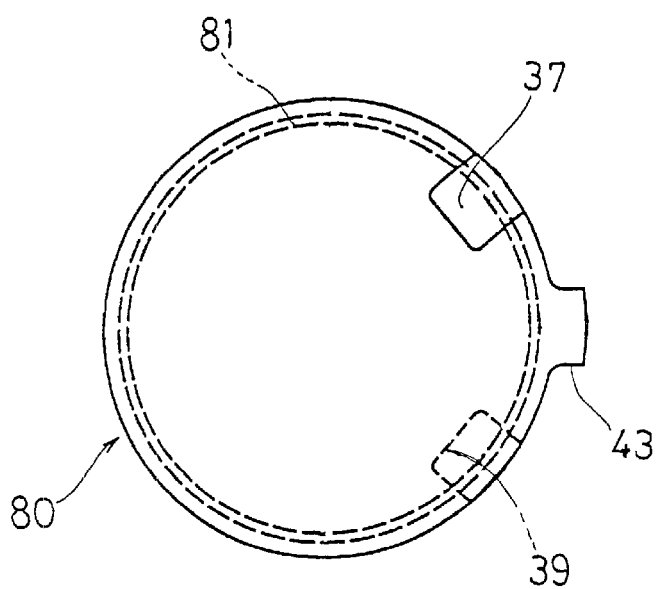
FIG. 20 is a plan view of an elastic film of the same vibration isolator.

FIG. 16 is a longitudinal sectional view showing a first mode of embodiment of the liquid sealed type vibration isolator of the second-mentioned invention, FIG. 17 a longitudinal sectional view of the same vibration isolator taken along a different plane, FIG. 19 a plan view of a partition, and FIG. 20 a plan view of an elastic film.

As shown in the drawings, the basic construction of the liquid sealed type vibration isolator of this invention is identical with that of the above-described first-mentioned invention. The parts the construction of which is identical with that of the corresponding parts of the first-mentioned invention are designated by the same reference numerals, and the detailed descriptions thereof are omitted. The vibration isolator of the second-mentioned invention generally has the following construction.

This vibration isolator includes an upper metal fixing member 2 secured to a vibration generating member, such as an engine, a lower metal fixing member secured to a body, a vibration isolating base member 4 formed of an elastic member of a rubber-like material connecting these two metal fixing members 2, 3 together, a diaphragm 6 provided on the lower metal fixing member 3 so as to be opposed to the vibration isolating base member 4, and forming a liquid chamber 5 between the diaphragm and vibration isolating base member 4, and a partition 7 dividing the liquid chamber 5 into main and auxiliary liquid chambers 5a, 5b.

A fixing bolt 9, and a pin 11 for positioning a large displacement preventing metal stopper are fixed to the upper metal fixing member 2. The lower metal fixing member 3 includes a bottom member 13 having an outer flange 13a at an upper end section thereof and a fixing bolt 15 at a bottom section thereof, and a cylindrical trunk portion 14. A lower end flange 14a of the cylindrical trunk portion 14 and the outer flange 13a of the bottom member 13 are fastened together by caulking. An outer circumferential portion of the diaphragm 6 is caulked to this fastened portion 16.

The vibration isolating base member 4 is formed of an elastic body of a rubber-like material having an umbrella-like shape, and vulcanization bonded at an upper portion thereof to the upper metal fixing member 2, and at a lower circumferential portion thereof to the cylindrical trunk portion of the lower metal fixing member 3. An inner end section of an upper end bent part 17 of the cylindrical trunk portion 14 is extended inward to a position beyond an inner circumferential surface of an orifice 18 and buried in the vibration isolating base member 4. A lower surface, i.e. a liquid chamber-side circumferential edge section of the vibration isolating base member 4 is formed as a flat surface portion 19, with which an elastic film of the partition 7 which will be described later is engaged. The elastic body of a rubber-like material of the vibration isolating base member 4 is extended in a thin film state from an outer circumferential edge section of the flat portion 19 thereof to a lower end of an inner surface of the cylindrical trunk portion 14 to form a cylindrical liquid chamber-forming rubber portion 22.

In the case of this invention, the partition 7 is formed of a cylindrical partition plate 70, and an elastic film 80 formed to a diameter larger than that of an upper cylindrical portion 71 of the partition plate 70 and formed of a disc type elastic body of rubber closing a central opening 72 of the partition plate.

As shown in the drawings, a lower end portion of the partition plate 70 is bent radially outward to form a flange 73, which is caulked to a fastened portion 16 of the lower metal fixing member 3. The part of the partition plate 70 which is lower than a vertically intermediate section thereof is expanded to form a stepped portion 74, which defines a bottom surface of the orifice, and a larger-diameter portion 75 lower than the stepped portion 74 is engaged under pressure with a liquid chamber-forming rubber portion 22. The partition plate 70 is provided at two portions of a circumferential section thereof with a recess 51 and a through hole 52 for communicating the orifice 18 with the main and auxiliary chambers 5a, 5b respectively.

The elastic film 80 is adapted to reduce a dynamic spring constant in a high-frequency region (especially, an engine noise region), and formed in the shape of a disc and engaged at an upper edge part of an outer circumferential portion thereof with a flat surface portion 19 of the vibration isolating base member 4. The elastic film 80 is provided in its lower surface with a positioning groove 81 extending in the direction of the whole circumference thereof as shown in FIG. 20, and the upper cylindrical portion 71 of the partition plate 70 is press fitted or inserted in the groove 81.

The elastic film 80 is provided at a part of an outer circumferential edge portion thereof with a recess 37 correspondingly to the recess 51 of the partition plate 70, and this recess 37 constitutes an opening communicating the main liquid chamber 5a and orifice 18 with each other. The elastic film 80 is also provided in an outer circumferential surface thereof with a lateral hole 39 correspondingly to the through hole 52 of the partition plate 70, and this lateral hole 39 and the through hole 52 of the partition plate 70 constitute an opening communicating the auxiliary liquid chamber 5b and orifice 18 with each other.

Between the recess 37 and lateral hole 39 of the elastic film 80, a partition wall 43 of a rubber-like material for preventing the short-circuiting of an orifice-communicating opening is molded so that the partition wall 43 is integral with the elastic film 80 and projects outward from a circumference thereof.

The diaphragm 6 has an elastic film 6a of a flexible rubber-like material, and an inner end portion of an annular outer circumferential reinforcing metal member 25 is buried firmly in an outer circumferential portion of the elastic film 6a, an outer end portion of this outer circumferential reinforcing metal member 25 being placed on the outer flange 13a of the bottom member 13. An air chamber 38 is formed between the diaphragm 6 and bottom member 13.

In order to assemble this vibration isolator 1, the partition is first assembled by press fitting or inserting the upper cylindrical portion 71 of the partition plate 70 into the groove 81 in the lower surface of the elastic film 80, and the lower end opened section of the cylindrical trunk portion 14 of the metal fixing member 3 is then set in an upwardly directed state in a liquid tank, the partition 7 being inserted therein with the elastic film 80 brought into contact with the flat surface portion 19 of the vibration isolating base member 4. The diaphragm 6 is then fixed, and the resultant product is taken out into the atmosphere, the residual liquid being regulated. The fastened portion 16 is then caulked to complete the assembling work.

In this assembled product, a space enclosed with the outer circumferential surface 80a of the elastic film 80, stepped portion 74 of the partition plate 70, liquid chamber-forming rubber portion 22 and the flat surface portion 19 of the liquid chamber-side circumferential surface of the vibration isolating base member 4 functions as the orifice 18. In this case, the elastic film 80 is engaged at the groove 81 in the lower surface thereof with the partition plate 70, whereby the elastic film 80 is radially positioned. Since the elastic film 80 is engaged at the upper end thereof with the flat surface portion 19 of the vibration isolating base member 4, and at the lower surface thereof with the stepped portion 74 of the partition plate 70, it is also positioned vertically. Consequently, the cross-sectional area of the orifice 18 formed by these members is set to a desired level, and excellent vibration damping characteristics are obtained.

Figure 21:
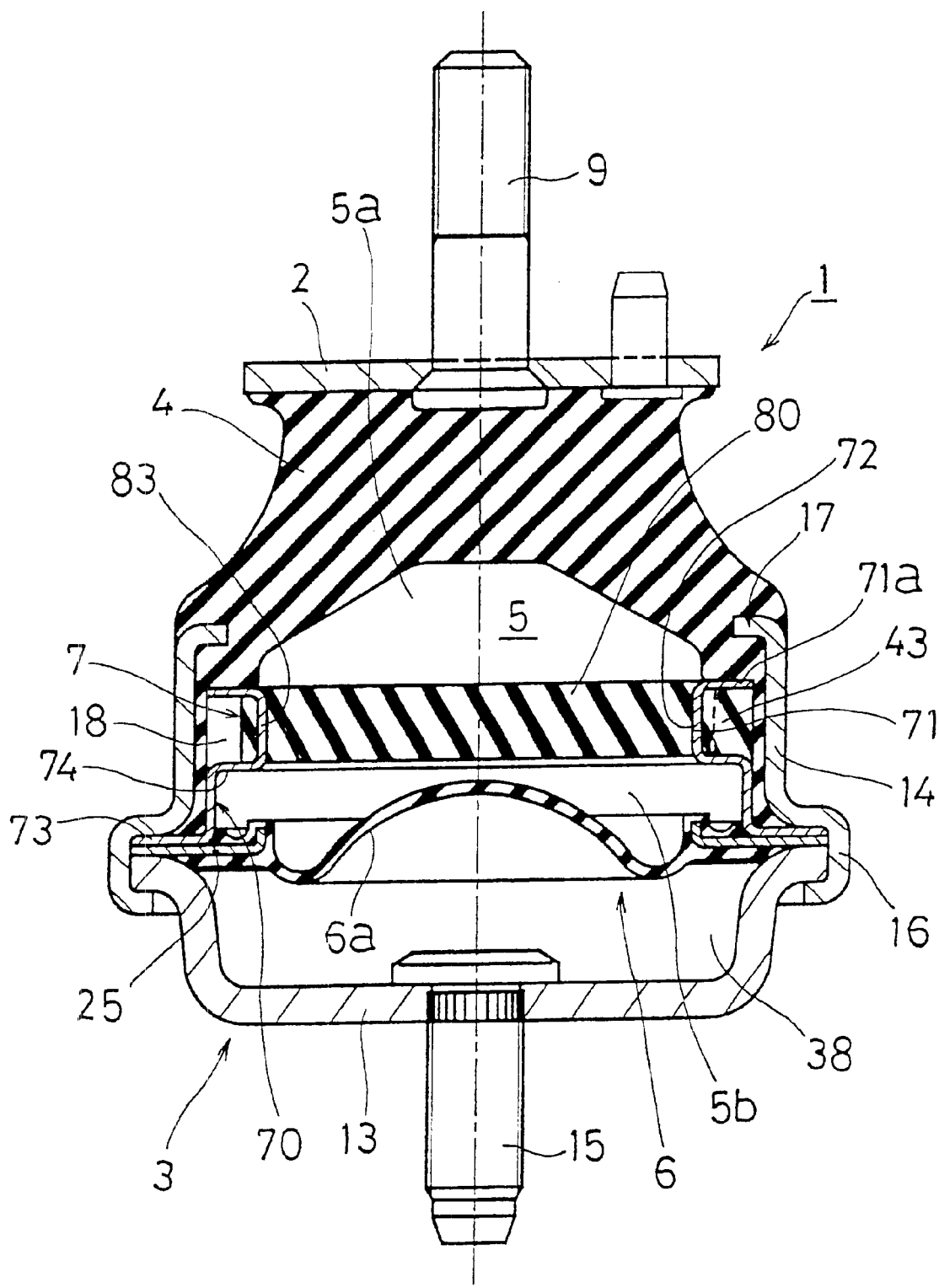
FIG. 21 is a longitudinal sectional view showing a second mode of embodiment of the liquid sealed type vibration isolator according to the second-mentioned invention.
Figure 22:
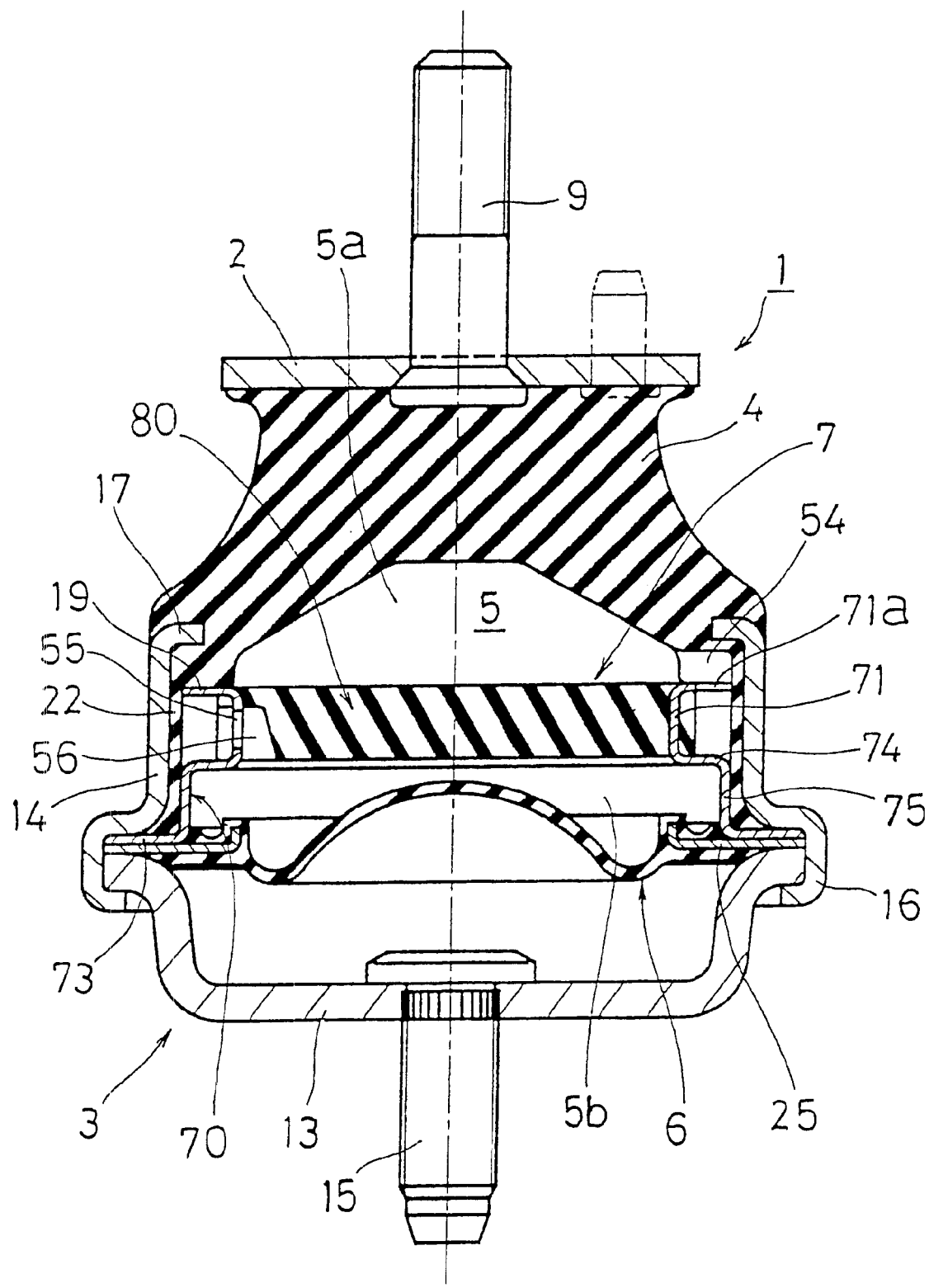
FIG. 22 is a longitudinal sectional view of the same vibration isolator taken along a different plane.
Figure 23:
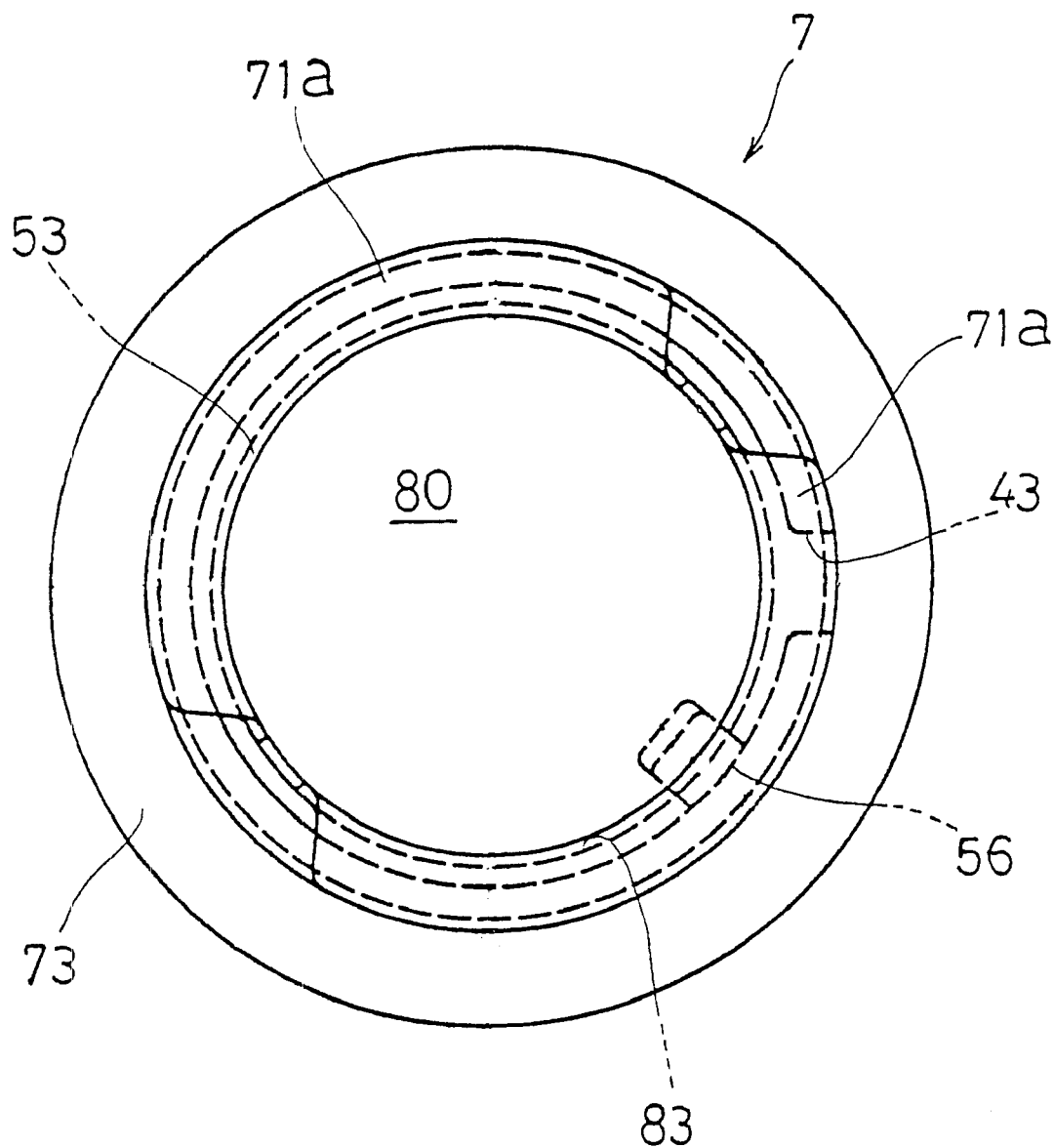
FIG. 23 is a plan view of a partition of the same vibration isolator.
Figure 24:
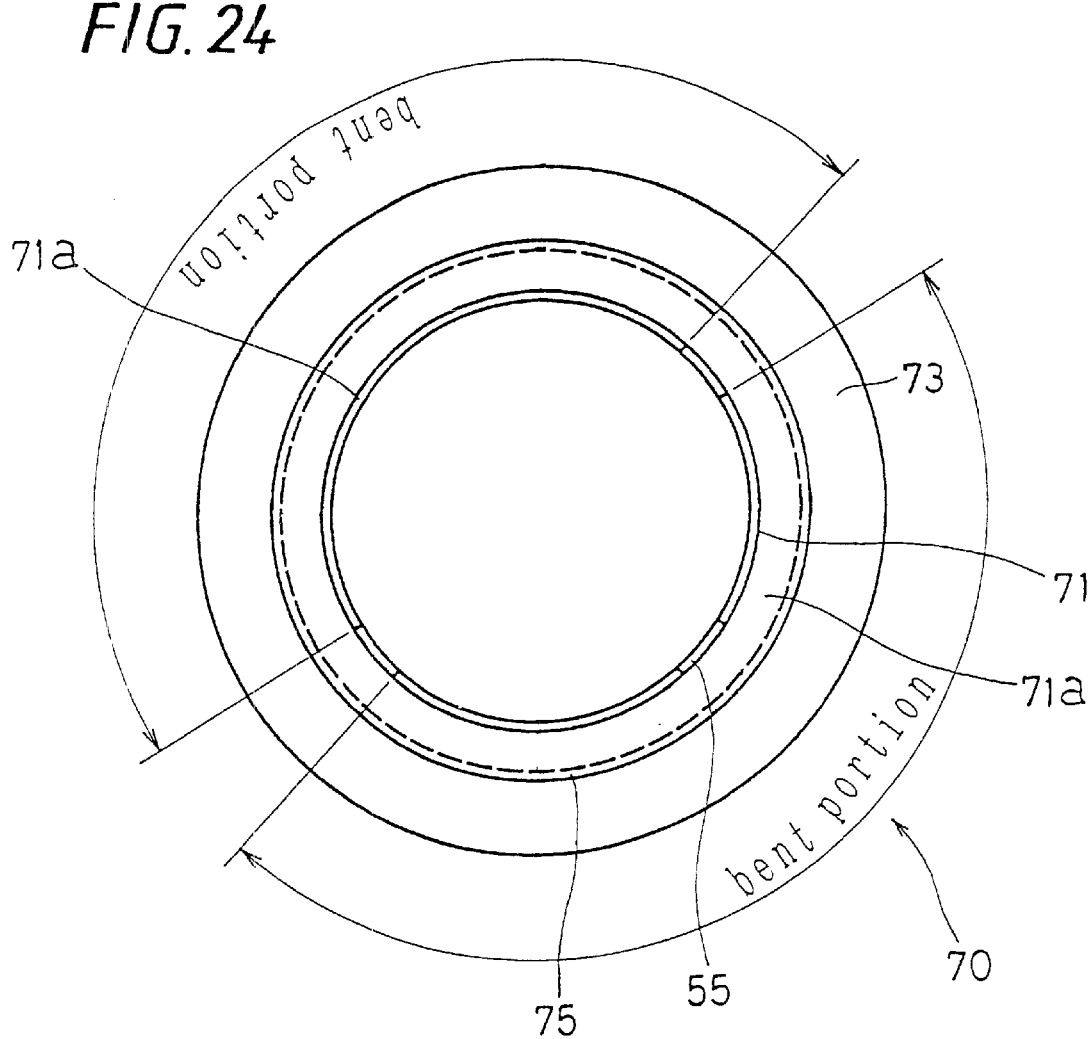
FIG. 24 is a plan view of a partition plate of the same vibration isolator.
Figure 25:
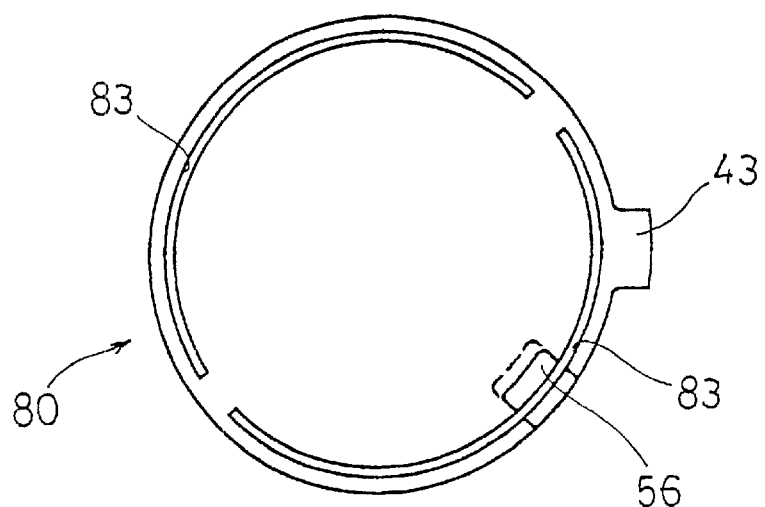
FIG. 25 is a plan view of an elastic film of the same vibration isolator.
Figure 26:
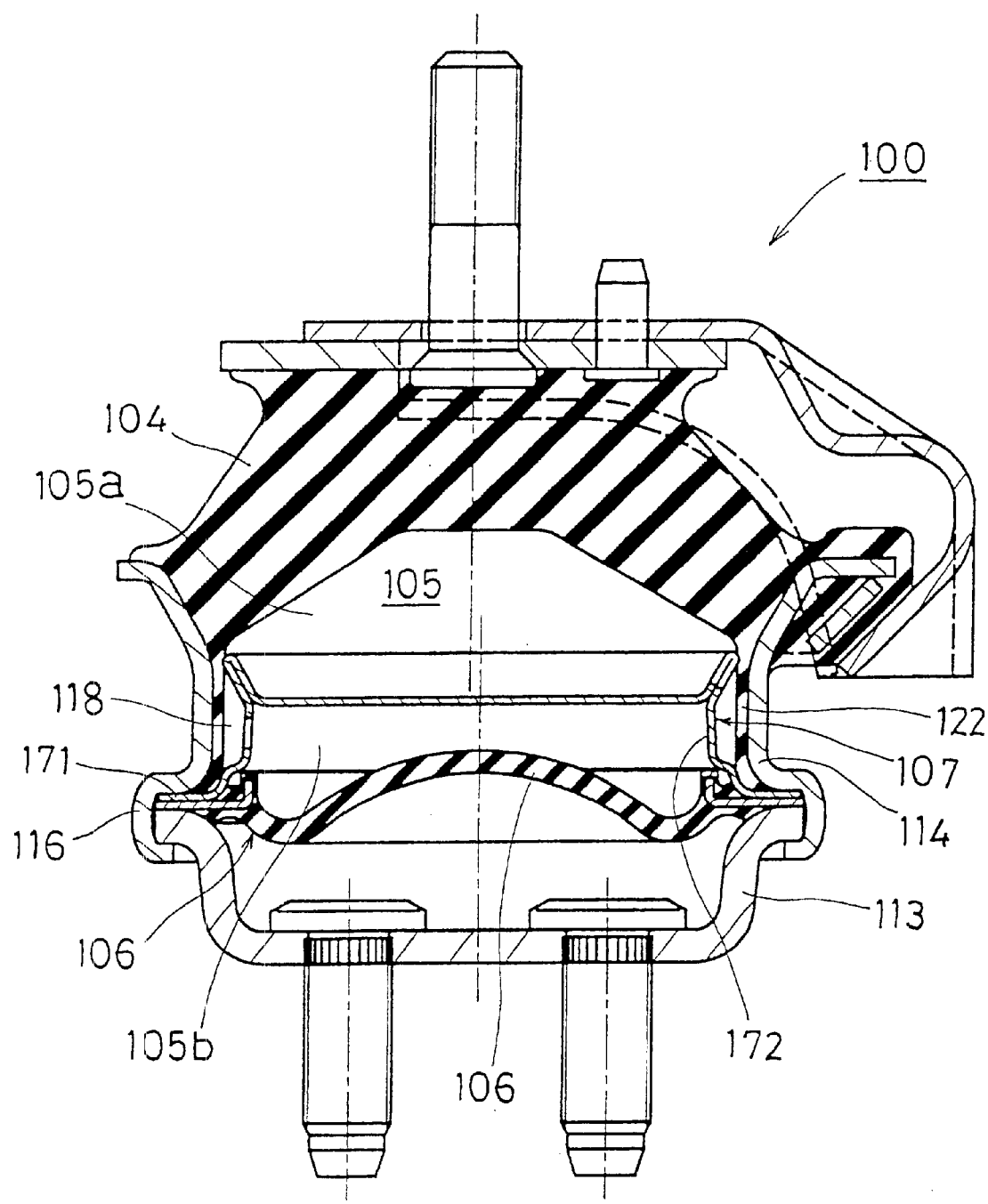
FIG. 26 is a sectional view showing an example of a liquid sealed type vibration isolator of the related art.
Figure 27:
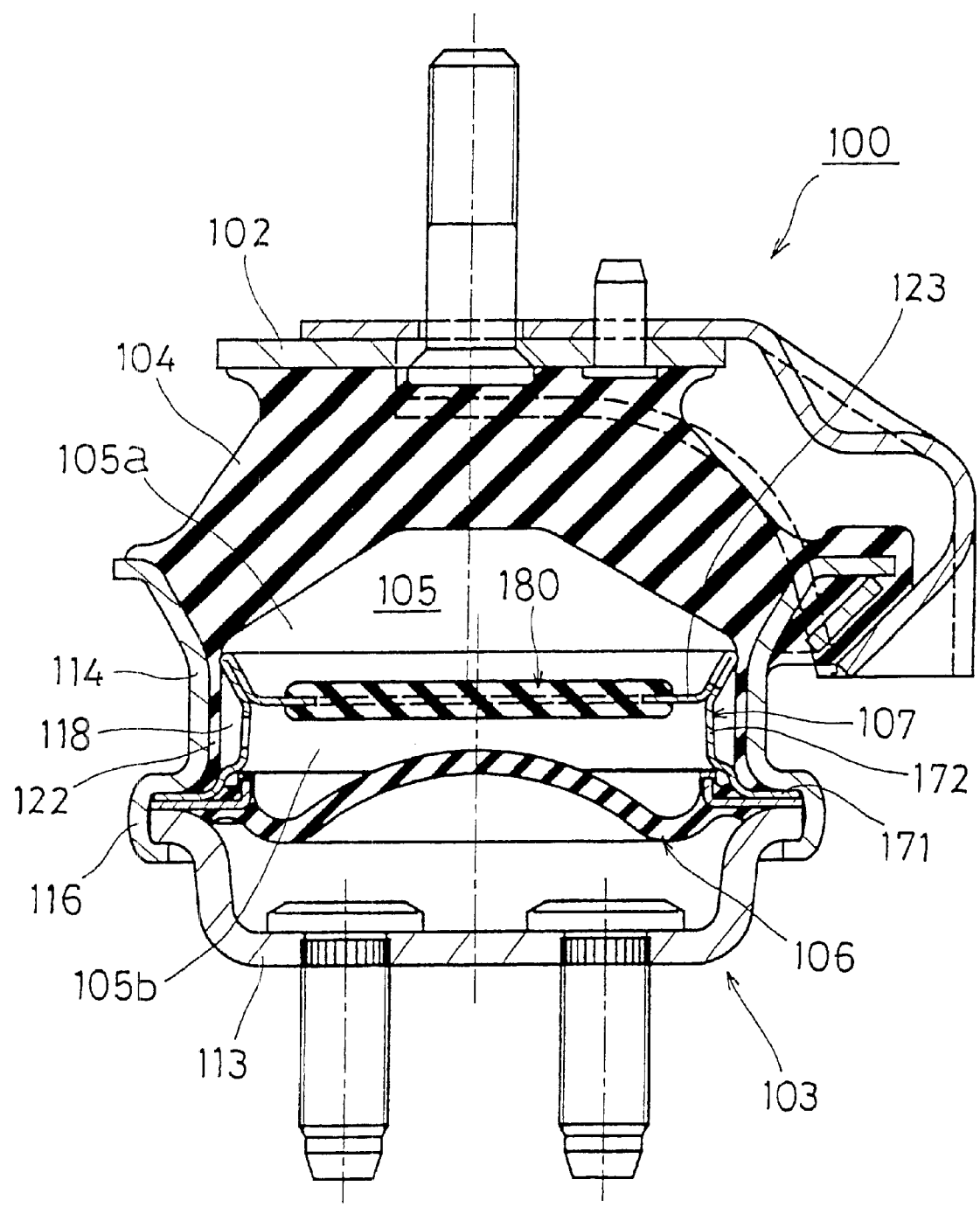
FIG. 27 is a sectional view showing another example of a liquid sealed type vibration isolator of the related art.
Figure 28:
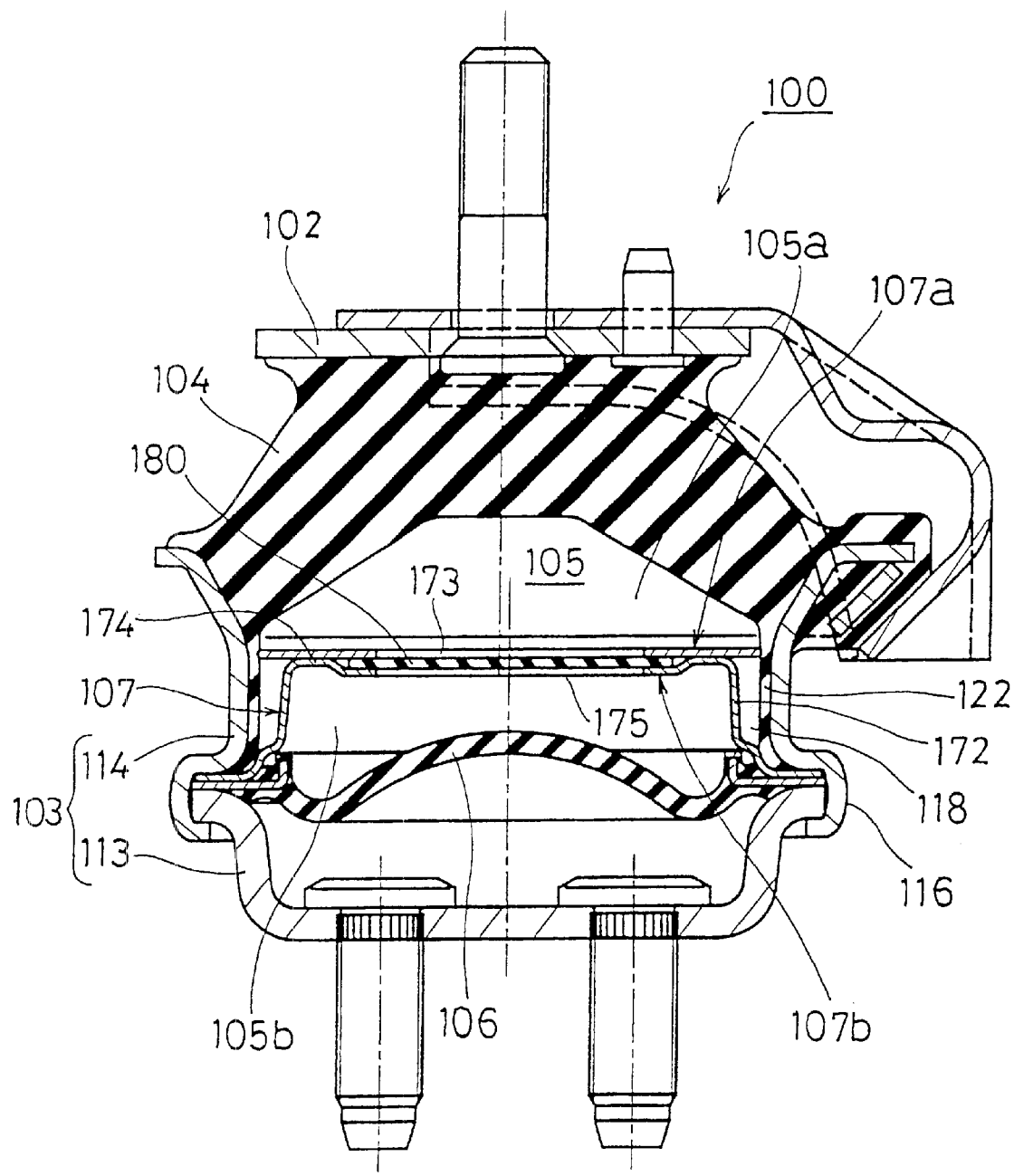
FIG. 28 is a sectional view showing still another example of a liquid sealed type vibration isolator of the related art.

FIG. 21 is a longitudinal sectional view of a liquid sealed type vibration isolator showing a second mode of embodiment of the second-mentioned invention, FIG. 22 a longitudinal sectional view of the same vibration isolator taken along a different plane, FIG. 23 a plan view of a partition, FIG. 24 a plan view of a partition plate, and FIG. 25 a plan view of an elastic film. The main parts the construction of which is identical with that of the corresponding parts of the above-described modes of embodiments are designated by the same reference numerals.

As shown in FIG. 23, a partition 7 in this mode of embodiment is identical with that in the first mode of embodiment in that it is formed of a cylindrical partition plate 70 and a disc type elastic film 80 but the shape of a hole for positioning the elastic film 80 and that of an upper portion, which is inserted into this hole, of the partition plate 70 are different from those of the corresponding parts of the first embodiment.

Namely, as shown in FIG. 24, an upper cylindrical portion 71 of the partition plate 70 is provided at an upper end thereof with an upwardly extended portion 71a, while the elastic film 80 is provided correspondingly to the extended portion 71a with a slit type through hole 83 extending from a lower surface of an outer circumferential edge portion of the elastic film 80 to an upper surface thereof. After the upper cylindrical portion 71 of the partition plate 70 has been press fitted or inserted into this through hole 83, the extended portion 71a at the upper end of the upper cylindrical portion 71 is bent, and the bent extended portion 71a and an intermediate stepped portion 74 of the partition plate 70 sandwich the elastic film 80 therebetween, the resultant product being caulked, whereby the elastic film 80 is fixed to the partition plate 70.

The diameter of an outer end of the bent extended portion 71a is set equal to the outer diameter of a lower large-diameter portion 75 of the partition plate 70, and an outer end section of the bent extended portion is formed so that it is press fitted into an inner circumferential surface of a liquid chamber-forming rubber portion 22. An upper surface of the bent extended portion 71a is adapted to be engaged with a liquid chamber-side flat surface portion 19 of a vibration isolating base member 4.

In this mode of embodiment, a recess 54 is formed in a liquid chamber-side portion of the vibration isolating base member 4, and used as an opening communicating a main liquid chamber 5a and an orifice 18 with each other. A through hole 55 is formed in an elastic film-passing portion of the partition plate 70 which is higher than the stepped portion 74 thereof, and a recess 56 is formed correspondingly to this through hole so as to extend from an outer circumferential side of the elastic film to a lower surface thereof. The recess 56 and the through hole 55 of the partition plate 70 form an opening communicating an auxiliary liquid chamber 5b and orifice 18 with each other.

Since the construction of the remaining portions of the partition plate 70 and elastic film 80 and that of the parts other than these are identical with that of the corresponding portions and parts of the first mode of embodiment, the descriptions thereof will be omitted.

In the structure of the second embodiment, a positioning operation is carried out by passing the upper end portion of the partition plate 70 through the through hole 83 provided in an outer circumferential portion of the elastic film 80, the radial positioning (centering) of the elastic film 80 can be done easily. Since the elastic film 80 is sandwiched in the direction of height (vertically) between the bent extended portion 51 and stepped portion 74 of the partition plate 70 and caulked, the combining of the partition plate 70 and elastic film 80 together can be done easily.

A few more sentences will be added. In any of the above modes of embodiments, the thickness of the rubber of the elastic film 80 may be set suitably in accordance with the required damping characteristics, and the invention is not limited to the illustrated modes of embodiments in this regard.

As is clear from the above description, the providing of an elastic film on a partition for the purpose of reducing a dynamic spring constant in a high-frequency region is done according to the second-mentioned invention by forming one cylindrical partition plate and a disc type elastic film separately, forming a positioning bore in a circumferential portion of a lower surface of the elastic film, and press fitting or inserting an upper portion of the partition plate into this bore. Therefore, a step, such as a bonding agent application step becomes unnecessary, and the dimensions of a metal vulcanization mold for the elastic film are reduced. This enables the partition plate and elastic film to be manufactured advantageously at a low cost.

What is claimed is:

1. A liquid sealed type vibration isolator comprising:

two metal fixing members for attachment to a vibration generating member and a support member;

a vibration isolating elastic base member interposed between the two metal fixing members;

a body member connected to the vibration isolating elastic base member;

a diaphragm disposed opposed to the vibration isolating elastic base member to define a liquid chamber between the vibration isolating elastic base member and the diaphragm in conjunction with the body member; and a partition disposed in the body member and dividing the liquid chamber into a first liquid chamber and a second liquid chamber, the partition having an outer circumferential portion defining an orifice in conjunction with the body member, the outer circumferential portion being bent to a substantially L-shaped cross section so as to define to an inner circumferential surface and a bottom surface of the orifice;

wherein the outer circumferential portion has an upper end section extended upward and inserted into an annular positioning groove formed in a liquid chamber-side circumferential edge portion of the vibration isolating base member, whereby the partition is positioned.

2. The liquid sealed type vibration isolator according to claim 1, wherein said substantially L-shaped cross section is limited to defining said inner circumferential surface and said bottom surface.

3. The liquid sealed type vibration isolator according to claim 2 wherein said upper end section of the outer circumferential portion of said partition is press fitted into said annular positioning groove.

4. The liquid sealed type vibration isolator according to claim 1 wherein said upper end section of the outer circumferential portion of said partition is press fitted into said annular positioning groove.

* * * * *